United States Patent
Wang et al.

(10) Patent No.: US 11,540,300 B2
(45) Date of Patent: Dec. 27, 2022

(54) METHOD AND APPARATUS FOR TRANSMISSION OF GROUP COMMON PDCCHS

(71) Applicant: Huawei Technologies Co., Ltd., Shenzhen (CN)

(72) Inventors: Da Wang, Shenzhen (CN); Jian Wang, Beijing (CN); Yifan Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 16/645,206

(22) PCT Filed: May 10, 2018

(86) PCT No.: PCT/CN2018/086282
§ 371 (c)(1),
(2) Date: Mar. 6, 2020

(87) PCT Pub. No.: WO2019/047549
PCT Pub. Date: Mar. 14, 2019

(65) Prior Publication Data
US 2020/0267740 A1    Aug. 20, 2020

(30) Foreign Application Priority Data

Sep. 8, 2017 (CN) .......................... 201710808064.8

(51) Int. Cl.
*H04W 72/12* (2009.01)
*H04W 76/27* (2018.01)
*H04L 1/00* (2006.01)
*H04L 5/00* (2006.01)
*H04W 72/04* (2009.01)

(52) U.S. Cl.
CPC ......... *H04W 72/121* (2013.01); *H04L 1/0038* (2013.01); *H04L 5/001* (2013.01); *H04W 72/042* (2013.01); *H04W 72/0466* (2013.01); *H04W 76/27* (2018.02)

(58) Field of Classification Search
None
See application file for complete search history.

(56) References Cited

U.S. PATENT DOCUMENTS

2010/0272048 A1   10/2010  Pan et al.
2015/0207606 A1    7/2015  Ko et al.
(Continued)

FOREIGN PATENT DOCUMENTS

CN    101772144 A     7/2010
CN    101909333 A    12/2010
(Continued)

OTHER PUBLICATIONS

CATT, "DL Control Channel Scheme for LTE-A", 3GPP TSG RAN WG1 Meeting #57, R1-091994, May 4-8, 2009, 4 pages, San Francisco, USA.
(Continued)

*Primary Examiner* — Anh Ngoc M Nguyen
(74) *Attorney, Agent, or Firm* — Slater Matsil, LLP

(57) ABSTRACT

This application provides an information transmission method and apparatus. The method includes: generating, by a network device, first information; and sending, by the network device, the first information to a terminal device, where the first information is used to instruct the terminal device to detect at least one group common PDCCH on N component carriers CCs, N is a positive integer and is less than or equal to M, M is a quantity of CCs configured for the terminal device, and M is a positive integer. Based on this, after receiving the first information, the terminal device detects the at least one group common PDCCH on the N CCs according to the first information.

15 Claims, 9 Drawing Sheets

(56) References Cited

U.S. PATENT DOCUMENTS

| | | | | |
|---|---|---|---|---|
| 2017/0251466 | A1* | 8/2017 | Astely | H04L 5/0048 |
| 2018/0115965 | A1 | 4/2018 | Takeda et al. | |
| 2018/0279223 | A1* | 9/2018 | Kim | H04L 5/0053 |
| 2018/0368114 | A1* | 12/2018 | Chen | H04W 24/10 |
| 2018/0376476 | A1* | 12/2018 | Lee | H04L 5/0053 |
| 2019/0045495 | A1* | 2/2019 | Chen | H04L 5/0007 |
| 2019/0053227 | A1* | 2/2019 | Huang | H04L 25/03006 |
| 2019/0165904 | A1* | 5/2019 | Jo | H04W 72/042 |
| 2020/0059327 | A1* | 2/2020 | Kini | H04W 72/042 |
| 2020/0136882 | A1* | 4/2020 | Jo | H04W 72/042 |

FOREIGN PATENT DOCUMENTS

| | | |
|---|---|---|
| CN | 104756433 A | 7/2015 |
| EP | 3480977 A1 | 5/2019 |
| WO | 2016121863 A1 | 8/2016 |
| WO | 2016163503 A1 | 10/2016 |

OTHER PUBLICATIONS

Huawei et al., "Structure of group-common PDCCH", 3GPP TSG RAN WG1 Meeting #90, R1-1712186, Aug. 21-25, 2017, 4 pages, Prague, Czech Republic.

LG Electronics, "Discussion on the contents of group common PDCCH", 3GPP TSG RAN WG1 Meeting #90, R1-1713171, Aug. 21-25, 2017, 8 pages, Prague, Czech Republic.

R1-1701637 Huawei, HiSilicon, "UE-group common control signaling", 3GPP TSG-RAN WG1 Meeting #88, Athens, Greece, Feb. 13-17, 2017, total 3 pages.

3GPP TS 38.213 V1.0.0 (Sep. 2017), 3rd Generation Partnership Project;Technical Specification Group Radio Access Network; NR; Physical layer procedures for control (Release 15), dated Sep. 7, 2017, total 16 pages.

3GPP TS 38.331 V0.0.5 (Aug. 2017), 3rd Generation Partnership Project;Technical Specification Group Radio Access Network; NR; Radio Resource Control (RRC);Protocol specification(Release 15), total 38 pages.

Kumar, N. et l., "Survey of downlink control channel resource allocation techniques in LTE", 2015 Annual IEEE India Conference (INDICON), Date of Conference: Dec. 17-20, 2015, 5 pages.

MediaTek Inc., Structure of GC PDCCH, 3GPP TSG RAN WG1 Meeting #90, R1-1713678, Aug. 21-25, 2017, 3 pages, Prague, P.R. Czechia.

ZTE, Contents for Group-common PDCCH, 3GPP TSG RAN WG1 Meeting #90, R1-1712445, Aug. 21-25, 2017, 4 pages, Prague, Czechia.

Qualcomm Incorporated, CA with mixed numerology, 3GPP TSG RAN WG1 Meeting #90, R1-1713456, Aug. 21-25, 2017, 6 pages,Prague, Czech Republic.

* cited by examiner

METHOD AND APPARATUS FOR TRANSMISSION OF GROUP COMMON PDCCHS

CROSS-REFERENCE TO RELATED APPLICATIONS

This application is a national stage of International Application No. PCT/CN2018/086282, filed on May 10, 2018, which claims priority to Chinese Patent Application No. 201710808064.8, filed on Sep. 8, 2017. Both of the aforementioned applications are hereby incorporated by reference in their entireties.

TECHNICAL FIELD

This application relates to the field of communications technologies, and in particular, to an information transmission method and apparatus.

BACKGROUND

In a 5G New Radio (new radio, NR) system, a system bandwidth may be divided into a plurality of component carriers (carrier component, CC), and a network device transmits, to user equipment (user equipment, UE) on each CC, a group common (group common) physical downlink control channel (physical downlink control channel, PDCCH) corresponding to the CC. The group common PDCCH is used to indicate common (common) information of UE included in a UE group (group), namely, group UE common information (group UE common information). All UEs of a base station may form one UE group, or all UEs of a base station may be divided into a plurality of UE groups.

In the prior art, to obtain common information, UE needs to detect a group common PDCCH on each CC to obtain group UE common information on CCs configured for the UE, causing a relatively large quantity of group common PDCCH detection times, and relatively large power consumption.

SUMMARY

This application provides an information transmission method and apparatus, to resolve an existing problem of relatively large power consumption caused by a relatively large quantity of group common PDCCH blind detection times of UE.

According to a first aspect, an embodiment of this application provides an information transmission method, and the method includes: generating, by a network device, first information; and sending, by the network device, the first information to a terminal device, where the first information is used to instruct the terminal device to detect at least one group common PDCCH on N component carriers CCs, N is a positive integer and is less than or equal to M, M is a quantity of CCs configured for the terminal device, and M is a positive integer. Based on this, after receiving the first information, the terminal device detects the at least one group common PDCCH on the N CCs according to the first information. Because the terminal device detects the group common PDCCH on a fixed CC indicated by the network device, a quantity of detection times is reduced, and power consumption of the terminal device is reduced.

It should be noted that, when N is equal to M, group common PDCCHs transmitted on all of the M CCs carry same group UE common information, and in other words, the terminal device is instructed to detect the at least one group common PDCCH on any one of the N component carriers CCs, so that the terminal device can choose to detect the group common PDCCH on any CC, and receive the group UE common information on the group common PDCCH.

In a possible design, the N CCs are in the M CCs configured for the terminal device. Based on this, the terminal device can detect the group common PDCCH on the N CCs in the configured M CCs, to avoid a power consumption increase caused when the terminal device detects a CC that is not configured for the terminal device.

In a possible design, the first information includes index values of the N CCs. In the foregoing design, the network device indicates the index values of the N CCs on which the at least one group common PDCCH is detected, so that the terminal device determines, based on the index values, a CC on which the at least one group common PDCCH is detected, and therefore a simple and effective manner is provided.

In a possible design, the group common PDCCH is used to indicate group user equipment UE common information of the M CCs configured for the terminal device. The group UE common information may include at least one of time domain unit format information, group UE frequency domain resource information, and preemption indication information.

In the foregoing design, the network device indicates, by using the group common PDCCH, the group UE common information of the M CCs configured for the terminal device, so that the terminal device determines a time-frequency domain resource used for subsequent data transmission.

In a possible design, the first information may include a correspondence among index values of the M CCs configured for the terminal device, the index values of the N CCs, and a field in the group UE common information; or the first information may include a correspondence among index values of the M CCs configured for the terminal device, the index values of the N CCs, a field in the group UE common information, and identification information used for scrambling the group UE common information.

In the foregoing design, by using the first information, the terminal device can determine a CC on which a group common PDCCH is detected, and determine a corresponding field, in the group UE common information carried on the detected group common PDCCH, from which group UE common information corresponding to a specific CC configured for the terminal device is obtained.

In a possible design, the group UE common information is scrambled by using identification information of a CC group in which the N CCs are located, or the group UE common information is scrambled by using identification information of a terminal device group in which the terminal device is located, or the group UE common information is scrambled by using identification information of the terminal device. In the foregoing design, the group UE common information is scrambled by using corresponding identification information, so that the terminal device can descramble the corresponding group UE common information by using the corresponding identification information.

In a possible design, the network device may send the first information to the terminal device in the following specific manner: sending, by the network device, the first information to the terminal device by using downlink control information DCI signaling, radio resource control RRC signaling, or cell broadcast signaling.

According to a second aspect, an embodiment of this application provides an information transmission method, and the method includes: receiving, by a terminal device, first information sent by a network device, where the first information is used to instruct the terminal device to detect at least one group common physical downlink control channel PDCCH on N component carriers CCs, N is a positive integer and is less than or equal to M, M is a quantity of CCs configured for the terminal device, and M is a positive integer; and detecting, by the terminal device, the at least one group common physical downlink control channel PDCCH on the N CCs according to the first information.

By using the foregoing design, because the terminal device detects the group common PDCCH on a fixed CC indicated by the network device, a quantity of detection times is reduced, and power consumption of the terminal device is reduced.

In a possible design, the N CCs are in the M CCs configured for the terminal device. Based on this, the terminal device can detect the group common PDCCH on the N CCs in the configured M CCs, to avoid a power consumption increase caused when the terminal device detects a CC that is not configured for the terminal device.

In a possible design, the first information includes index values of the N CCs. In the foregoing design, the network device indicates the index values of the N CCs on which the at least one group common PDCCH is detected, so that the terminal device determines, based on the index values, a CC on which the at least one group common PDCCH is detected, and therefore a simple and effective manner is provided.

In a possible design, the group common PDCCH is used to indicate group user equipment UE common information of the M CCs configured for the terminal device; and the terminal device may detect the at least one group common PDCCH on the N CCs according to the first information in the following manner: obtaining, by the terminal device on the N CCs according to the first information, the group UE common information that is of the M CCs configured for the terminal device and that is carried on the at least one group common PDCCH. The group UE common information includes at least one of time domain unit format information, group UE frequency domain resource information, and preemption indication information. In the foregoing design, the network device indicates, by using the group common PDCCH, the group UE common information of the M CCs configured for the terminal device, so that the terminal device determines a time-frequency domain resource used for subsequent data transmission.

In a possible design, the first information includes a correspondence among index values of the M CCs configured for the terminal device, the index values of the N CCs, and a field in the group UE common information; or a correspondence among index values of the M CCs configured for the terminal device, the index values of the N CCs, a field in the group UE common information, and identification information used for scrambling the group common PDCCH.

In the foregoing design, by using the first information, the terminal device can determine a CC on which a group common PDCCH is detected, and determine a corresponding field, in the group UE common information carried on the detected group common PDCCH, from which group UE common information corresponding to a specific CC configured for the terminal device is obtained.

In a possible design, the group UE common information is scrambled by using identification information of a CC group in which the at least one CC is located, or the group UE common information is scrambled by using identification information of a terminal device group in which the terminal device is located, or the group UE common information is scrambled by using identification information of the terminal device. In the foregoing design, the group UE common information is scrambled by using corresponding identification information, so that the terminal device can descramble the corresponding group UE common information by using the corresponding identification information.

In a possible design, the terminal device may receive, in the following specific manner, the first information sent by the network device: receiving, by the terminal device, downlink control information DCI signaling sent by the network device, where the DCI signaling carries the first information; or receiving, by the terminal device, radio resource control RRC signaling sent by the network device, where the RRC signaling carries the first information; or receiving, by the terminal device, cell broadcast signaling sent by the network device, where the RRC signaling carries the first information.

According to a third aspect, an embodiment of this application provides an information transmission method, and the method includes: generating, by a network device, group user equipment UE common information of M component carriers CCs configured for the terminal device; and sending, by the network device to the terminal device on at least one group common physical downlink control channel PDCCH on N component carriers CCs, the group UE common information of the M CCs configured for the terminal device, where N is a positive integer and is less than or equal to M, and M is a positive integer.

By using the foregoing design, the network device sends, to the terminal device on the at least one group common PDCCH on the N CCs, the group UE common information of the M CCs configured for the terminal device, so that the terminal device receives, on the at least one group common PDCCH on the N CCs, the group UE common information sent by the network device, thereby reducing a quantity of blind detection times of the terminal device.

It should be noted that, when N is equal to M, group common PDCCHs transmitted on all of the M CCs carry same group UE common information, and in other words, the terminal device may be configured to detect the at least one group common PDCCH on any one of the N component carriers CCs, so that the terminal device can choose to detect the group common PDCCH on any CC, and receive the group UE common information on the group common PDCCH.

In a possible design, the N CCs are in the M CCs configured for the terminal device.

In a possible design, the network device and the terminal device may determine, in a static configuration manner, a CC on which and a terminal device to which the group common PDCCH used to carry the group UE common information is sent.

In another possible design, the network device may further perform configuration for the terminal device in a semi-static manner, so that the method may further include: sending, by the network device, first information, where the first information is used to instruct the terminal device to detect the at least one group common PDCCH on the N CCs.

In a possible design, the first information includes index values of the N CCs.

In a possible design, the group UE common information is scrambled by using identification information of a CC group in which the at least one CC is located, or the group UE common information is scrambled by using identification information of a terminal device group in which the terminal device is located, or the group UE common information is scrambled by using identification information of the terminal device.

In a possible design, the first information may further include a correspondence among index values of the M CCs configured for the terminal device, the index values of the N CCs, and a field in the group UE common information; or a correspondence among index values of the M CCs configured for the terminal device, the index values of the N CCs, a field in the group UE common information, and identification information used for scrambling the group UE common information.

In a possible design, the sending, by the network device, first information to the terminal device includes: sending, by the network device, the first information to the terminal device by using downlink control information DCI signaling, radio resource control RRC signaling, or cell broadcast signaling.

In a possible design, the group UE common information includes at least one of time domain unit format information, group UE frequency domain resource information, and preemption indication information.

According to a fourth aspect, an embodiment of this application provides an information transmission method, including: detecting, by a terminal device, at least one group common physical downlink control channel PDCCH on N component carriers CCs, where the at least one group common PDCCH is used to indicate group user equipment UE common information of M CCs configured for the terminal device, N is a positive integer and is less than or equal to M, and M is a positive integer; and receiving, by the terminal device on the detected at least one group common PDCCH, the group UE common information of the M CCs configured for the terminal device.

The group UE common information may include at least one of time domain unit format information, group UE frequency domain resource information, and preemption indication information.

In a possible design, the N CCs are in the M CCs configured for the terminal device.

In a possible design, a network device and the terminal device may determine, in a static configuration manner, a specific CC on which and a terminal device to which the group common PDCCH used to carry the group UE common information is sent.

In another possible design, the network device may perform configuration for the terminal device in a semi-static manner. Therefore, before the terminal device detects the at least one group common physical downlink control channel PDCCH on the N component carriers CCs, the terminal device receives first information sent by the network device, where the first information is used to instruct the terminal device to detect the at least one group common PDCCH on the N CCs, and the terminal device detects the at least one group common PDCCH on the N component carriers CCs according to the first information.

In a possible design, the first information includes index values of the N CCs.

In a possible design, the group UE common information is scrambled by using identification information of a CC group in which the N CCs are located, or the group UE common information is scrambled by using identification information of a terminal device group in which the terminal device is located, or the group UE common information is scrambled by using identification information of the terminal device.

In a possible design, the first information may further include a correspondence among index values of the M CCs configured for the terminal device, the index values of the N CCs, and a field in the group UE common information; or a correspondence among index values of the M CCs configured for the terminal device, the index values of the N CCs, a field in the group UE common information, and identification information used for scrambling the group UE common information.

In a possible design, that the terminal device receives first information sent by the network device includes: receiving, by the terminal device, downlink control information DCI signaling sent by the network device, where the DCI signaling carries the first information; or receiving, by the terminal device, radio resource control RRC signaling sent by the network device, where the RRC signaling carries the first information; or receiving, by the terminal device, cell broadcast signaling sent by the network device, where the RRC signaling carries the first information.

According to a fifth aspect, a structure of a network device may include a generation unit and a sending unit, and the units may perform corresponding functions in any one of the design examples of the first aspect or the third aspect. For details, refer to detailed descriptions in the method examples. Details are not described herein again.

When behavior of the network device is implemented by hardware, the structure of the network device includes a transceiver, a processor, and a memory, the transceiver is configured to perform communication interaction with a terminal device, and the processor is configured to support the network device in performing a corresponding function in the method described in the first aspect or the third aspect. The memory is coupled to the processor, and the memory stores a program instruction and data that are necessary for the network device. Specifically, the processor is configured to invoke and execute a software program stored in the memory, and receive and send data by using the transceiver to implement the method according to any design in the first aspect or the third aspect.

According to a sixth aspect, a structure of a terminal device may include a receiving unit and a detection unit, and the units may perform corresponding functions in any one of the design examples of the second aspect or the fourth aspect. For details, refer to detailed descriptions in the method examples. Details are not described herein again.

When behavior of the terminal device is implemented by hardware, the structure of the terminal device includes a transceiver, a processor, and a memory, the transceiver is configured to perform communication interaction with a base station, and the processor is configured to support the terminal device in performing a corresponding function in the method described in the second aspect or the fourth aspect. The memory is coupled to the processor, and the memory stores a program instruction and data that are necessary for the terminal device. Specifically, the processor is configured to invoke and execute a software program stored in the memory, and receive and send data by using the transceiver to implement the method according to any design in the second aspect or the fourth aspect.

According to a seventh aspect, an embodiment of this application further provides a computer storage medium, and the storage medium stores a software program. When being read and executed by one or more processors, the software program can implement the method according to any design in any aspect of the first aspect to the fourth aspect.

According to an eighth aspect, an embodiment of this application provides a computer program product that includes an instruction, and when the computer program product runs on a computer, the computer performs the method according to any design in the first aspect to the fourth aspect.

According to a ninth aspect, an embodiment of this application provides a chip, and the chip is connected to a memory, and is configured to read and execute a software program stored in the memory, to implement the method according to any design in the first aspect to the fourth aspect.

According to a tenth aspect, an embodiment of this application provides a system, and the system includes the network device according to the fifth aspect and the terminal device according to the sixth aspect.

DETAILED DESCRIPTION OF ILLUSTRATIVE EMBODIMENTS

Figure 1:
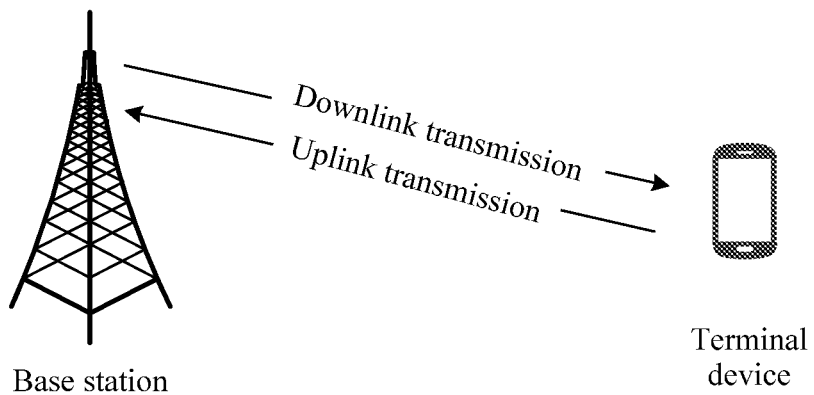
FIG. 1 is a schematic diagram of an NR system architecture according to an embodiment of this application.

The embodiments of this application may be applied to but not limited to a communications system in which uplink control signaling can be transmitted, such as a New Radio (English: New radio, NR for short) system. An architecture that may be applied to the NR system is shown in FIG. 1, and the NR system includes a base station and a terminal device, and uplink transmission and downlink transmission are performed between the base station and the terminal device.

The embodiments of this application may be applied to a carrier aggregation (carrier aggregation, CA) scenario or a dual connectivity (dual-connectivity, DC) scenario.

For ease of subsequent description, the following explains some terms in this application to facilitate understanding of a person skilled in the art.

A group common PDCCH (group common PDCCH) is for a group of UEs, and is used to indicate common information of the group of UEs, namely, group UE common information (group UE common information).

The group common PDCCH includes a plurality of fields. Each field occupies a specific quantity of information bits, and different fields are used to carry different information.

Group UE common information (group UE common information): All UEs of a base station may form one UE group (UE group), or all UEs of a base station may be divided into a plurality of UE groups. The group UE common information includes common information corresponding to all UEs in a UE group. Alternatively, the group of UEs may be understood as all UEs in a cell, or a UE group into which all UEs in a cell are divided according to a specific rule (for example, according to different services), or a group consisting of UEs in a plurality of cells.

The group UE common information includes, for example, any one of time domain unit format information, group UE frequency domain resource information, and preemption indication information (preemption indication). The group UE common information may further include common information of another group of UEs, and this is not limited in this application. A time domain unit may be any one of a timeslot, a subframe, a frame, a mini timeslot (mini-slot, or non-slot), K orthogonal frequency division multiplexing (orthogonal frequency division multiplexing, OFDM) symbols, or the like, where K is an integer greater than or equal to 1.

Figure 2:
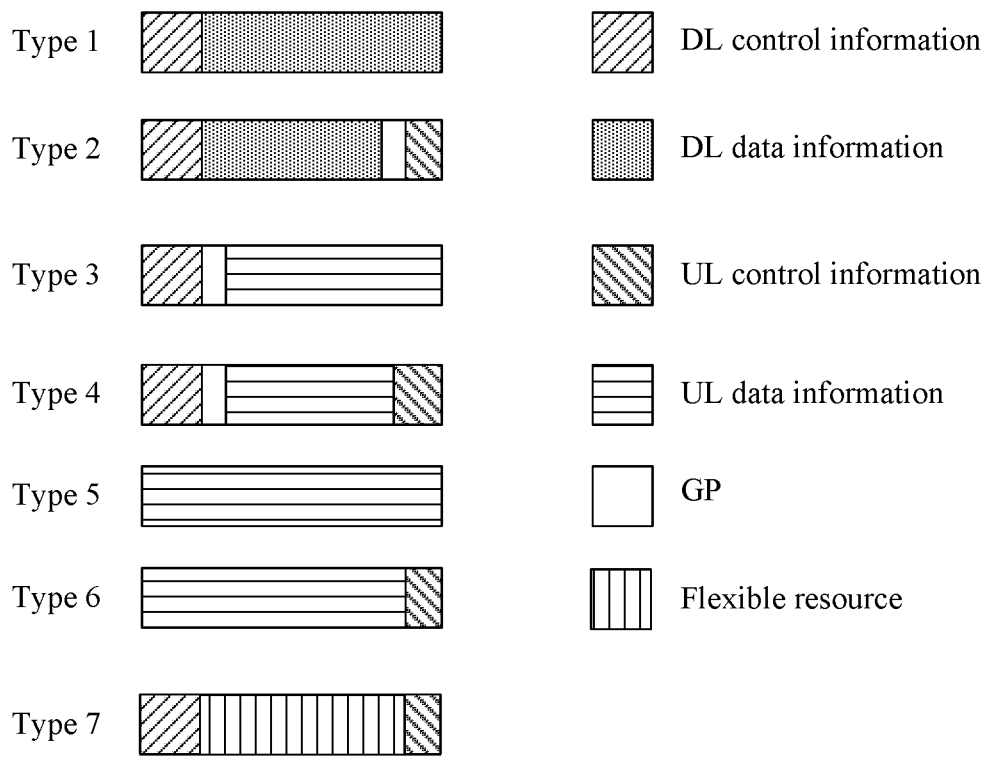
FIG. 2 is a schematic diagram of a timeslot according to an embodiment of this application.

For example, for timeslot format information (slot format related information, SFI), a plurality of timeslot (slot) structures may be supported in the 5G NR system. A timeslot may include one part or a plurality of parts, for example, include only an uplink (uplink, UL) transmission timeslot, or include only a downlink (downlink, UL) transmission timeslot, or include a UL transmission timeslot and a DL transmission timeslot. The timeslot further includes a guard interval (guard interval, GP) used for uplink-downlink switching by both receiving and sending parties. Alternatively, the timeslot may include an unknown (unknown) resource or a flexible (flexible) resource. In other words, the UE does not know whether the resource is used for UL transmission or DL transmission, or the resource may be flexibly used for UL transmission or DL transmission, or the like. The UL transmission may include UL data transmission and UL control transmission, and the DL transmission may include DL data transmission and DL control transmission. FIG. 2 shows timeslots respectively corresponding to type 1 to type 7. Therefore, one slot includes several parts, and the base station needs to indicate symbol lengths occupied by the several parts to the terminal device.

In the embodiments of this application, the network device may be a base station, or a device that can implement a base station function. In the embodiments of this application, a base station is used as an example for description. The base station (for example, an access point) may be a device that is in an access network and that communicates with a terminal device over an air interface by using at least one sector. The base station may further coordinate attribute management of the air interface. For example, the base station may be an evolved NodeB in LTE, or a gNB (gNB) in the NR system, or an access point. This is not limited in the embodiments of this application. It should be noted that, the base station described in the embodiments of this application may be a base station device, or may be a relay device, or another network element device that has a base station function.

The terminal device may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks through a radio access network (English: radio access network, RAN for short). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (English: personal communication service, PCS for short) phone, a cordless phone, a Session Initiation Protocol (English: session initiation protocol, SIP for short) phone, a wireless local loop (English: wireless local loop, WLL for short) station, or a personal digital assistant (personal digital assistant, PDA for short). The wireless terminal may also be referred to as a system, a subscriber unit (English: subscriber unit, SU for short), a subscriber station (English: subscriber station, SS for short), a mobile station (English: mobile station, MB for short), a mobile station (mobile), a remote station (English: remote station, RS for short), an access point (English: access point, AP for short), a remote terminal (English: remote terminal, RT for short), an access terminal (English: access terminal, AT for short), a user terminal (English: user terminal, UT for short), a user agent (English: user agent, UA for short), a terminal device (English: user device, UD for short), or user equipment (English: user equipment, UE for short). Subsequently, the terminal device is referred to as UE.

In addition, it should be understood that, in the description of this application, terms "first" and "second" are only used for a purpose of distinguishing between descriptions, but cannot be understood as indication or implication of relative importance, and cannot be understood as an indication or implication of a sequence. The term "a plurality of" in the description of this application means two or more than two.

The embodiments of this application provide an information transmission method and apparatus, to resolve an existing problem of relatively large power consumption caused by a relatively large quantity of group common PDCCH detection times of a terminal device. The method and the apparatus are conceived based on a same invention. The method and the apparatus have similar principles for resolving the problems. Therefore, for implementation of the apparatus and the method, reference may be made to each other, and details of repeated parts are not described.

Figure 3:
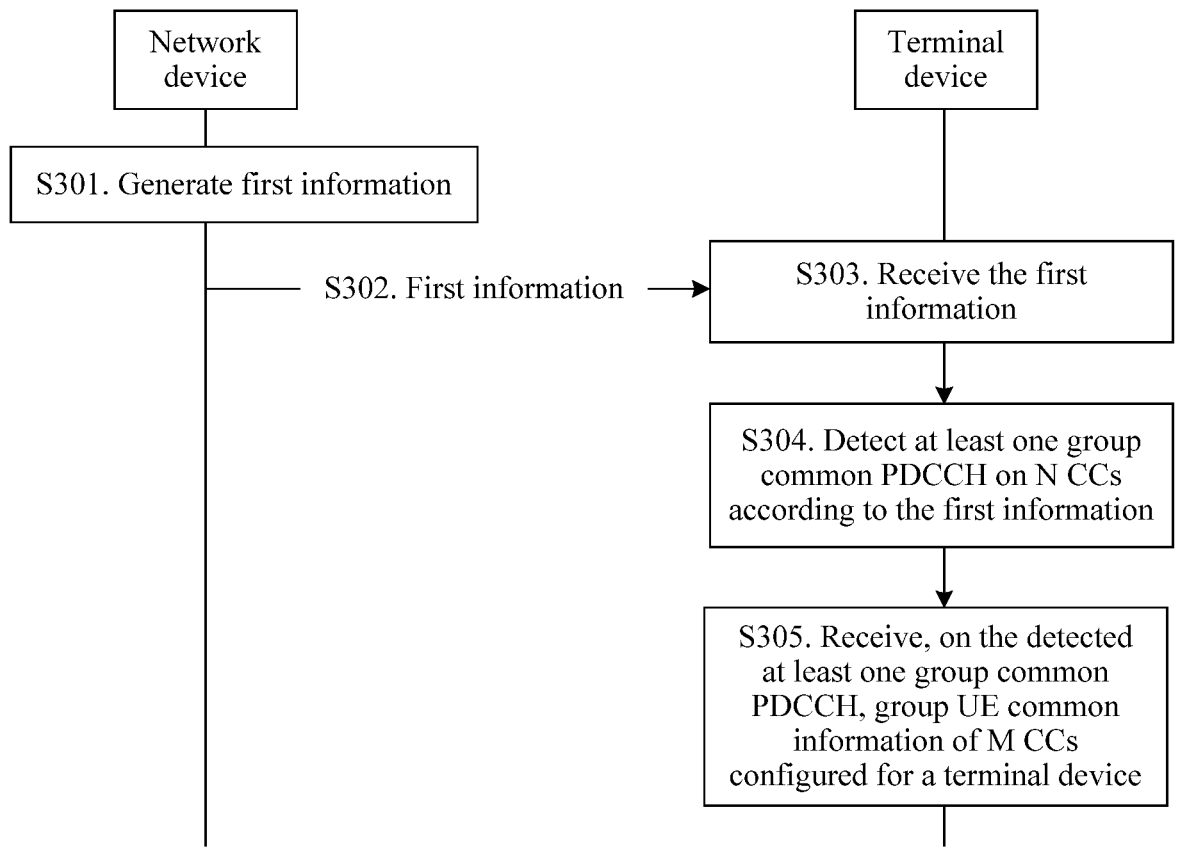
FIG. 3 is a flowchart of an information transmission method according to an embodiment of this application.

Referring to FIG. 3, FIG. 3 is a schematic flowchart of an information transmission method according to an embodiment of this application. The information transmission method includes the following steps.

S301. A network device generates first information.

S302. The network device sends the first information to a terminal device, where the first information is used to instruct the terminal device to detect at least one group common PDCCH on N component carriers CCs, N is a positive integer and is less than or equal to M, and M is a quantity of CCs configured for the terminal device.

The first information may include index values of the N CCs occupied by the at least one group common PDCCH.

S303. The terminal device receives the first information sent by the network device, where the first information is used to instruct the terminal device to detect the at least one group common PDCCH on the N component carriers CCs, N is a positive integer and is less than or equal to M, and M is the quantity of CCs configured for the terminal device.

S304. The terminal device detects the at least one group common PDCCH on the N CCs according to the first information.

By using the foregoing solution, before the terminal device detects the group common PDCCH, the network device indicates, to the terminal device, a CC on which the terminal device detects the group common PDCCH, so that the terminal device does not need to detect all CCs to obtain the group common PDCCH, thereby reducing a quantity of blind detection times of the terminal device, and reducing power consumption of the terminal device.

Optionally, the N CCs may be in the M CCs configured for the terminal device. To be specific, the network device may configure the at least one group common physical downlink control channel PDCCH to be carried on N of the M CCs configured for the terminal device, and indicate the configuration to the terminal device, thereby reducing a quantity of blind detection times of the terminal device, and reducing power consumption.

Optionally, the group common PDCCH is used to indicate group UE common information of the M CCs configured for the terminal device, and after step S304 in which the terminal device detects the at least one group common PDCCH on the N CCs according to the first information, the method may further include the following step:

S305. The terminal device receives, on the detected at least one group common PDCCH, group UE common information of the M CCs configured for the terminal device.

It should be noted that, when N is equal to M, group common PDCCHs on all of the M CCs carry same group UE common information, so that the terminal device can choose to detect the group common PDCCH on any CC, and receive the group UE common information on the group common PDCCH.

Based on this, after obtaining the group UE common information, the terminal device can determine, based on the group UE common information, information used for data transmission or receiving, such as a time-frequency domain resource, a timeslot format, or a preemption indication.

Optionally, the network device may send the first information to the terminal device in the following specific manners:

The network device sends the first information to the terminal device by using downlink control information (downlink control information, DCI) signaling, radio resource control (radio resource control, RRC) signaling, or cell broadcast signaling. Therefore, the terminal device may receive, in the following specific manners, the first information sent by the network device: The terminal device receives the DCI signaling sent by the network device, where the DCI signaling carries the first information; or the terminal device receives the RRC signaling sent by the network device, where the RRC signaling carries the first information; or the terminal device receives the cell broadcast signaling sent by the network device, where the RRC signaling carries the first information.

In this embodiment of this application, the first information may be specifically used to instruct, in any one of the following manners, the terminal device to detect the at least one group common PDCCH on the N CCs:

Manner 1: The first information includes index values of the N CCs configured for the terminal device.

Manner 2: The first information includes a correspondence among index values of the M CCs configured for the terminal device, index values of the N CCs carrying the group common PDCCH, and a field in the group UE common information (group UE common information).

Manner 3: The first information includes a correspondence among index values of the M CCs configured for the terminal device, index values of the N CCs carrying the group common PDCCH, a field in the group UE common information, and identification information used for scrambling the group UE common information.

Manner 4: The first information includes index values of the N CCs configured for the terminal device and a correspondence in Manner 2 or Manner 3. In this manner, the network device may send, to the terminal device by using same signaling, the correspondence and the index values of the N CCs configured for the terminal device, or the network device may separately send, to the terminal device by using different signaling, the correspondence and the index values of the N CCs configured for the terminal device. This is not specifically limited in this embodiment of this application.

The following specifically describes a solution provided in this embodiment of this application with reference to a specific application scenario. The following uses as an example in which the network device is a base station. Because group UE common information of terminal devices included in a terminal device group is the same, one terminal device group is subsequently used as an example for description.

This embodiment of this application may be applied to a carrier aggregation scenario or a dual connectivity scenario.

In the carrier aggregation scenario, there may be two cases. Case 1: All CCs occupied by a base station are in one CC group. In other words, all CCs form one CC group. Case 2: All CCs included in a base station are divided into L CC groups, where L is greater than 2.

In the DC scenario, there may be two cases. Case 1: There is one macro cell and a plurality of small cells, and the macro cell and the plurality of small cells form one group. Case 2: There is a plurality of macro cells and a plurality of small cells, and the plurality of macro cells and the plurality of small cells may be divided into a plurality of groups.

Generally, a macro cell (Macro cell) occupies one CC and each small cell (small cell) occupies one CC, so that one CC occupied by the macro cell (Macro cell) and a plurality of CCs occupied by the plurality of small cells may form one CC group. Based on this, the following specifically describes the carrier aggregation scenario from a perspective of a CC. For information transmission manners in a macro cell and a small cell in the DC scenario, refer to an information transmission manner in the carrier aggregation scenario described from the perspective of a CC, and details are not described again.

Case 1 in the carrier aggregation scenario is specifically described in Embodiment 1.

Embodiment 1

All CCs occupied by a base station are in one CC group. In other words, all the CCs form one CC group. The base station may configure N CCs in the CC group to be used to carry at least one group common PDCCH. The at least one group common PDCCH is used to carry group UE common information (group UE common information) of all the CCs in the CC group. For example, the group UE common information includes SFI. After obtaining the SFI on the N CCs, UE can determine, based on the SFI, a timeslot format of a specific CC.

For example, the base station occupies a CC1 to a CC6. The CC1 is a CC used to carry the at least one group common PDCCH, and the base station sends first information to UE in all UE groups. The first information is used to instruct the UE to detect the at least one group common PDCCH on the CC1, and the at least one group common PDCCH carries the group UE common information of all the CCs in the CC group. Therefore, after receiving the first information, the UE can detect the at least one group common PDCCH on the CC1 according to the first information, and obtain, on the at least one group common PDCCH, group UE common information of a CC configured for the UE.

Based on this, when configuring a CC for the UE, the base station needs to configure the CC1 for all the UE groups.

Specifically, in a case described in Manner 1, the first information may include an index value of the CC1 used to carry the at least one group common PDCCH, so that the terminal device can determine, by using the index value of the CC1, to detect the group common PDCCH on the CC1.

In a case described in Manner 2, the first information may include a correspondence among an index value of a CC configured for the terminal device, an index value of a CC carrying the group common PDCCH, and a field in the group UE common information. Therefore, by using the first information, the UE can determine a CC on which the group common PDCCH is detected, and can determine a field that is in the group UE common information carried on the group common PDCCH and that includes group UE common information of a specific CC. For example, as shown in Table 1, the correspondence may be notified to the UE in a table manner, and certainly may also be notified to the UE in another manner other than a table.

In a case described in Manner 3, the first information may include a correspondence among an index value of a CC configured for the terminal device, an index value of a CC carrying the group common PDCCH, identification information used for scrambling the group UE common information, and a field in the group UE common information.

The group UE common information may be scrambled by using identification information of the CC group, or the group UE common information may be scrambled by using identification information of a UE group to which the CC group is allocated, or the group UE common information may be scrambled by using identification information of any UE to which the CC group is allocated, or the group UE common information may be scrambled by using identification information configured on a network side. This is not specifically limited in this application. Therefore, by using the first information, the UE can determine a CC on which the group common PDCCH is detected, and identification information used for descrambling the group UE common information carried on the group common PDCCH, and can determine a field that is in the descrambled group UE common information and that includes group UE common information of a specific CC.

TABLE 1

| Index value of a CC configured for the UE | N CCs used to carry the group common PDCCH | Field (field) in the group UE common information |
| --- | --- | --- |
| CC1 | CC1 | field1 |
| CC2 | CC1 | field2 |
| CC3 | CC1 | field3 |
| CC4 | CC1 | field4 |
| CC5 | CC1 | field5 |
| CC6 | CC1 | field6 |

In a case described in Manner 4, the first information may include an index value of the CC used to carry the at least one group common PDCCH and one of the correspondence in Manner 2 and the correspondence in Manner 3. The base station may send, to the UE by using same or different signaling, the index value of the CC used to carry the at least one group common PDCCH and the correspondence described in Manner 2 or Manner 3.

In the foregoing solution, a quantity of blind detection times of the UE is reduced to a maximum extent, and the UE only needs to detect the group common PDCCH on one CC to obtain the group UE common information of the CC configured for the UE.

However, in the foregoing case, CCs configured for each UE need to include a CC carrying the group common PDCCH, causing inflexible scheduling.

Certainly, a plurality of CCs may be selected to carry group common PDCCH, and the group common PDCCH on each CC may carry group UE common information of all CCs. In this case, a plurality of CCs include the group common PDCCH. Although scheduling flexibility is improved, overheads of the group UE common information in the group common PDCCH are relatively large, and if not all the CCs are allocated to the UE, the UE does not need to know the group UE common information of all the CCs.

In Case 1 in the DC scenario, there is one macro cell and a plurality of small cells, and the macro cell and the plurality of small cells form one group. The macro cell is specifically configured to carry a group common PDCCH, and the group common PDCCH is used to carry group UE common information of all cells.

Case 2 in the carrier aggregation scenario is specifically described in Embodiment 2.

Embodiment 2

All CCs occupied by a base station are divided into a plurality of CC groups. The base station may configure one or more CCs in each CC group to be used to carry at least one group common PDCCH, and the at least one group common PDCCH is used to carry group UE common information of all CCs in the CC group. For example, the group UE common information includes SFI. After obtaining the SFI on the one or more CCs in the CC group, UE can determine, based on the SFI, a CC on which a format of a timeslot is located in the CC group.

For example, a base station totally occupies 20 CCs that are divided into four groups, and each group includes five CCs. One or more CCs may be selected from the five CCs in each group to carry one group common PDCCH. In this embodiment of this application, that one CC is selected in each group to carry the group common PDCCH is used as an example, and the group common PDCCH is used to indicate group UE common information on all the CCs in the CC group.

In the foregoing configuration, the base station may indicate, to the UE by using first information, the CC used to carry the group common PDCCH. The first information is used to instruct the UE to detect the group common PDCCH on at least one component carrier CC, and the group common PDCCH carries group UE common information of CCs configured for the UE.

In Case 2 in the DC scenario, there is a plurality of macro cells and a plurality of small cells, and the plurality of macro cells and the plurality of small cells form a plurality of groups. For example, four macro cells and 20 small cells may be divided into four groups, and each group includes five cells that are one macro cell and four small cells. In each group, the macro cell carries a group common PDCCH, and the group common PDCCH carries group UE common information of all cells in the group. Therefore, the base station sends first information to the UE, and the first information instructs the UE to detect a group common PDCCH by using a macro cell, so that the UE obtains, on the group common PDCCH, group UE common information of all cells in a group corresponding to the macro cell.

Specifically, in this embodiment of this application, Embodiment 2 is specifically described in two possible manners. In a first possible manner, a CC is configured for the UE based on a granularity of a CC. To be specific, CCs configured for the UE may span different CC groups, for example, include a CC1 in a CC group 1, and further include a CC4 and a CC5 in a CC group 2. In a second possible manner, a CC is configured for the UE based on a granularity of a CC group. To be specific, all CCs included in one CC group or a plurality of CC groups are configured for the UE.

In the first possible manner (a CC is configured for the UE based on a granularity of a CC):

For example, all CCs occupied by a base station are divided into two CC groups: a CC group 1 and a CC group 2, and CCs included in the CC group 1 do not overlap (overlap) with CCs included in the CC group 2. Specifically, the CC group 1 includes a CC1 to a CC4, and the CC group 2 includes a CC5 to a CC8.

Figure 4:
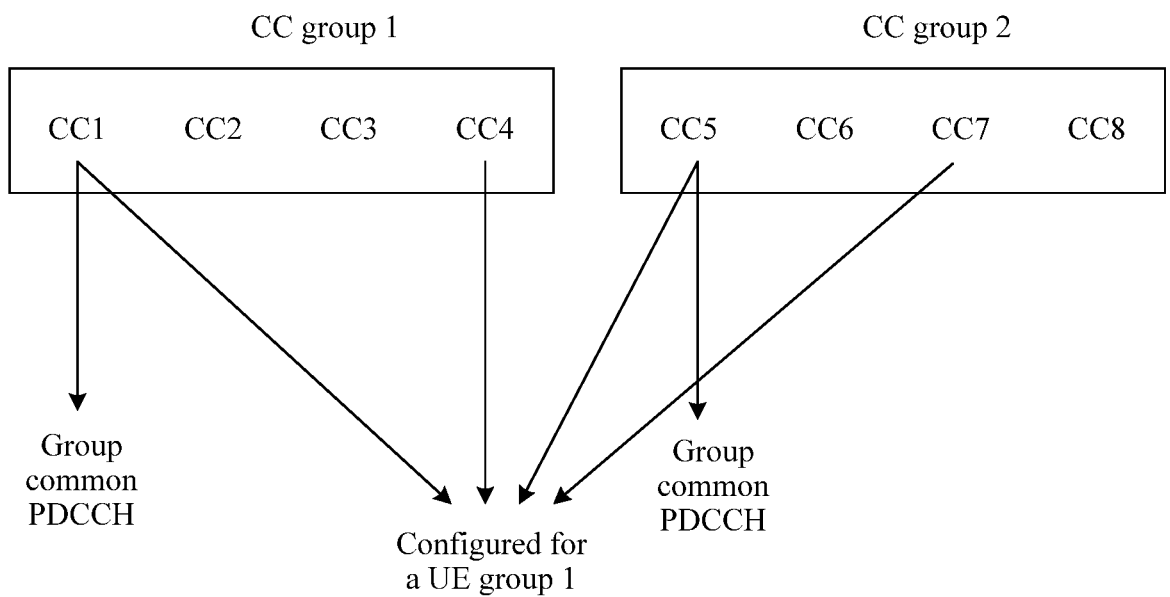
FIG. 4 is a first schematic diagram of a CC configuration manner according to an embodiment of this application.

Referring to FIG. 4, it is assumed that the CC1 and the CC4 in the CC group 1 and the CC5 and a CC7 in the CC group 2 are configured for a UE group 1. Each of the CC1 in the CC group 1 and the CC5 in the CC group 2 is used to carry a group common PDCCH. A group common PDCCH on the CC1 is used to carry group UE common information on the CC1 to the CC4, and a group common PDCCH on the CC5 is used to carry group UE common information on the CC5 to the CC8.

Based on this configuration manner, the base station sends first information to each UE in the UE group 1, and the following uses one UE as an example. The base station sends the first information to the UE, where the first information is used to instruct the UE to detect a group common PDCCH on the CC1 and the CC5. The first information may be used to instruct, in any one of Manner 1 to Manner 4, the terminal device to detect at least one group common PDCCH on the CC1 and the CC5. A case described in Manner 2 is used as an example herein. The first information may include a correspondence among an index value of a CC configured for the UE, an index value of a CC carrying the group common PDCCH, and a field in the group UE common information. Therefore, by using the first information, the UE can determine a CC on which the group common PDCCH is detected, and can determine a field that is in the group UE common information carried on the detected group common PDCCH and that includes group UE common information of a specific CC, for example, as shown in Table 2.

TABLE 2

| Index value of a CC configured for the UE | N CCs used to carry the group common PDCCH | Field (field) included in the group UE common information |
|---|---|---|
| CC1 | CC1 | field1 |
| CC4 | CC1 | field4 |
| CC5 | CC5 | field2 |
| CC7 | CC5 | field3 |

After receiving the first information, the UE detects the group common PDCCH on the CC1 and the CC5 according to the first information, receives group UE common information on the group common PDCCH detected on the CC1, and obtains group UE common information of the CC1 from the field 1 in the group UE common information; receives the group UE common information on the group common PDCCH detected on the CC1, and obtains group UE common information of the CC4 from the field 4 in the group UE common information; receives group UE common information on the group common PDCCH detected on the CC5, and obtains group UE common information of the CC5 from the field 2 in the group UE common information; and receives the group UE common information on the group common PDCCH detected on the CC5, and obtains group UE common information of the CC7 from the field 3 in the group UE common information.

By using the foregoing solution, the UE only needs to detect the group common PDCCH on the CCs indicated by the base station, and obtains, on the group common PDCCH, the group UE common information of the CCs configured for the UE, thereby reducing a quantity of blind detection times of the UE, and reducing power consumption of the UE.

In addition, in this embodiment of this application, before configuring the CCs for the UE, the base station may determine a CC on which the group common PDCCH used to carry the group UE common information is located, so that during CC configuration for the UE, the base station only needs to ensure that the CCs configured for the UE include the CC carrying the group common PDCCH, and does not necessarily need to configure a specific CC for each UE. Therefore, flexibility of CC configuration for the UE is improved in comparison with Embodiment 1.

For example, all CCs occupied by a base station are divided into two CC groups: a CC group 1 and a CC group 2, and CCs included in the CC group 1 overlap (overlap) with CCs included in the CC group 2. Specifically, the CC group 1 includes a CC1 to a CC4, the CC group 2 includes the CC4 to a CC7, and the CC4 is a common CC in the CC group 1 and the CC group 2.

In a first configuration manner, a group common PDCCH is carried on a common CC, and in a second configuration manner, a group common PDCCH is carried on a non-common CC.

Figure 5:
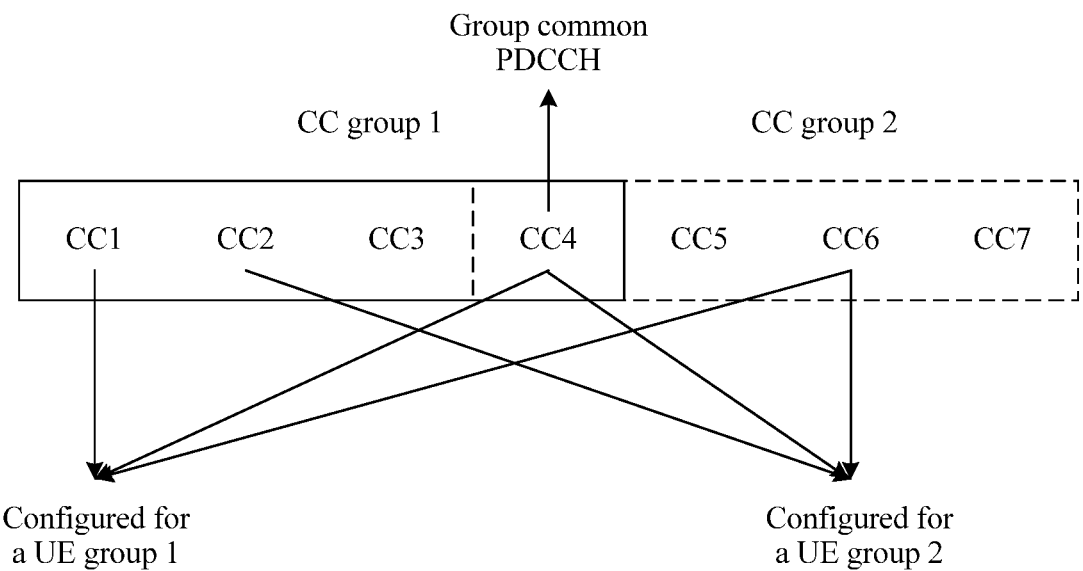
FIG. 5 is a second schematic diagram of a CC configuration manner according to an embodiment of this application.

For the first configuration manner in the first possible manner, that a group common PDCCH is carried on a common CC is described as follows:

Referring to FIG. 5, it is assumed that CCs configured for a UE group 1 include the CC1, the CC4, and a CC6, and CCs allocated to a UE group 2 include a CC2, the CC4, and the CC6. The CC4 is used to carry a group common PDCCH, and the group common PDCCH on the CC4 is used to carry group UE common information on the CC1 to the CC7.

Based on this configuration manner, the base station sends information 1 to each UE in the UE group 1, and sends information 2 to each UE in the UE group 2. The information 1 is used to instruct UE1 to detect a group common PDCCH on the CC4, and the information 2 is used to instruct UE2 to detect a group common PDCCH on the CC4. The following uses the UE1 in the UE group 1 as an example. The information 1 may be used to instruct, in any one of Manner 1 to Manner 4, the UE1 to detect at least one group common PDCCH on the CC4. A case described in Manner 2 is used as an example. The first information 1 includes a correspondence among an index value of a CC configured for the UE1, an index value of a CC carrying the group common PDCCH, and a field in the group UE common information. By using the first information, the UE1 can determine a CC on which the group common PDCCH is detected, and can determine a field that is in the group UE common information carried on the detected group common PDCCH and that includes group UE common information of a specific CC, for example, as shown in Table 3.

TABLE 3

| Index value of a CC configured for the UE | N CCs used to carry the group common PDCCH | Field (field) in the group UE common information |
|---|---|---|
| CC1 | CC4 | field1 |
| CC4 | CC4 | field4 |
| CC6 | CC4 | field6 |

After receiving the information 1, the UE1 detects the group common PDCCH on the CC4 according to the information 1, receives the group UE common information on the group common PDCCH detected on the CC4, and obtains group UE common information of the CC1 from the field 1 in the group UE common information; receives the group UE common information on the group common PDCCH detected on the CC4, and obtains group UE common information of the CC4 from the field 4 in the group UE common information; and receives the group UE common information on the group common PDCCH detected on the CC4, and obtains group UE common information of the CC6 from the field 6 in the group UE common information.

By using the foregoing solution, the UE only needs to detect the group common PDCCH on the CCs indicated by the base station, and obtains, on the group common PDCCH, the group UE common information of the CCs configured for the UE, thereby reducing a quantity of blind detection times of the UE, and reducing power consumption of the UE.

In addition, in this embodiment of this application, before configuring the CCs for the UE, the base station may determine a CC on which the group common PDCCH used to carry the group UE common information is located, so that during CC configuration for the UE, the base station only needs to ensure that the CCs configured for the UE include the CC carrying the group common PDCCH, and does not necessarily need to configure a specific CC for each UE. Therefore, flexibility of CC configuration for the UE is improved in comparison with Embodiment 1.

Figure 6:
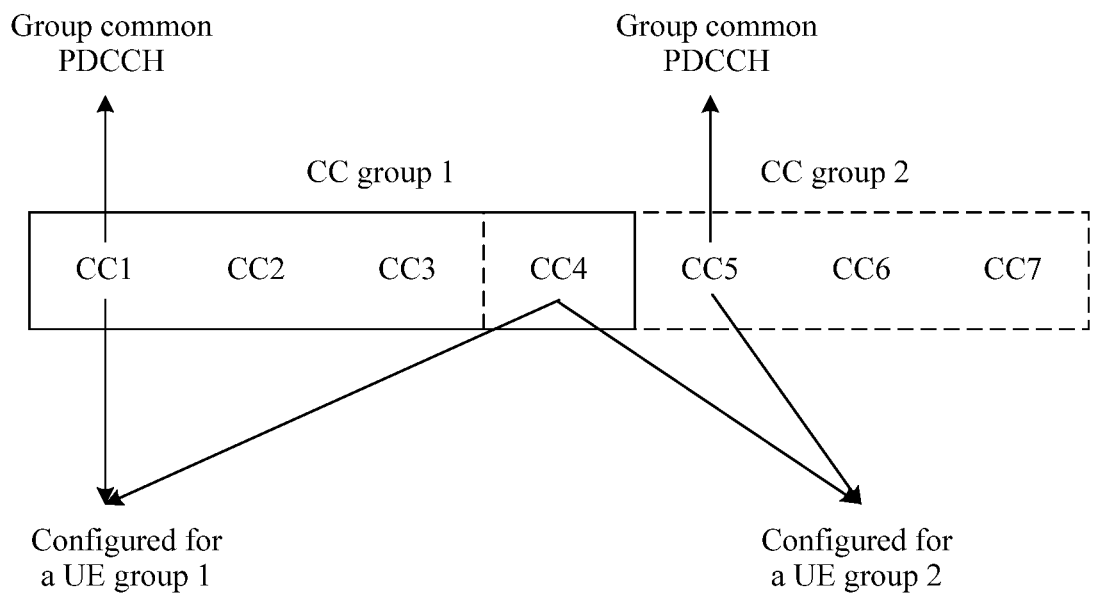
FIG. 6 is a third schematic diagram of a CC configuration manner according to an embodiment of this application.

For the second configuration manner in the first possible manner, that a group common PDCCH is carried on a non-common CC is described as follows:

Referring to FIG. 6, it is assumed that CCs configured for a UE group 1 include the CC1 and the CC4, and CCs allocated to a UE group 2 include the CC4 and a CC5. The CC1 and the CC5 are used to carry a group common PDCCH. A group common PDCCH on the CC1 is used to carry group UE common information on the CC1 to the CC4, and a group common PDCCH on the CC5 is used to carry group UE common information on the CC4 to the CC7.

Based on this configuration manner, the base station sends information 1 to each UE in the UE group 1, and the information 1 is used to instruct the UE in the UE group 1 to detect a group common PDCCH on the CC1. The base station sends information 2 to each UE in the UE group 2, and the information 2 is used to instruct the UE in the UE group 2 to detect a group common PDCCH on the CC5.

UE1 in the UE group 1 and UE2 in the UE group 2 are used as examples.

The base station sends the information 1 to the UE1. The information 1 may be used to instruct, in any one of Manner 1 to Manner 4, the UE1 to detect the at least one group common PDCCH on the CC1. A case described in Manner 2 is used as an example. The information 1 may include a correspondence among an index value of a CC configured for the UE1, an index value of a CC carrying the group common PDCCH, and a field in the group UE common information. Therefore, by using the information 1, the UE1 can determine a CC on which the group common PDCCH is detected, and can determine a field that is in the group UE common information carried on the detected group common PDCCH and that includes group UE common information of a specific CC, for example, as shown in Table 4.

TABLE 4

| Index value of a CC configured for the UE1 | N CCs used to carry the group common PDCCH | Field (field) in the group UE common information |
|---|---|---|
| CC1 | CC1 | field1 |
| CC4 | CC1 | field4 |

After receiving the information 1, the UE1 detects the group common PDCCH on the CC1 according to the information 1, receives the group UE common information on the detected group common PDCCH, and obtains group UE common information of the CC1 from the field 1 in the group UE common information; and receives the group UE common information on the detected group common PDCCH, and obtains group UE common information of the CC4 from the field 4 in the group UE common information.

The base station sends the information 2 to the UE2. The information 2 may be used to instruct, in any one of Manner 1 to Manner 4, the UE2 to detect the at least one group common PDCCH on the CC5. A case described in Manner 2 is used as an example. The information 2 may include a correspondence among an index value of a CC configured for the UE2, an index value of a CC carrying the group common PDCCH, and a field in the group UE common information. Therefore, by using the information2, the UE2 can determine a CC on which the group common PDCCH is detected, and can determine a field that is in the group UE common information carried on the detected group common PDCCH and that includes group UE common information of a specific CC, for example, as shown in Table 5.

TABLE 5

| Index value of a CC configured for the UE2 | N CCs used to carry the group common PDCCH | Field (field) in the group UE common information |
|---|---|---|
| CC4 | CC5 | field1 |
| CC5 | CC5 | field2 |

After receiving the information 2, the UE2 detects the group common PDCCH on the CC5 according to the information 2, receives the group UE common information on the detected group common PDCCH, and obtains group UE common information of the CC4 from the field 1 in the group UE common information; and receives the group UE common information on the detected group common PDCCH, and obtains group UE common information of the CC5 from the field 2 in the group UE common information.

By using the foregoing solution, the UE only needs to detect the group common PDCCH on the CCs indicated by the base station, and obtains, on the group common PDCCH, the group UE common information of the CCs configured for the UE, thereby reducing a quantity of blind detection times of the UE, and reducing power consumption of the UE.

In addition, in this embodiment of this application, before configuring the CCs for the UE, the base station may determine a CC on which the group common PDCCH used to carry the group UE common information is located, so that during CC configuration for the UE, the base station only needs to ensure that the CCs configured for the UE include the CC carrying the group common PDCCH, and does not necessarily need to configure a specific CC for each UE. Therefore, flexibility of CC configuration for the UE is improved in comparison with Embodiment 1. In addition, when there are a relatively large quantity of common CCs in different CC groups, and when the CC used to carry the group common PDCCH is not a common CC, flexibility of CC configuration for the UE can be further improved compared with a manner in which the CC used to carry the group common PDCCH is a common CC, to enable system load balance.

The following uses four CC groups as an example, and any two CC groups include a common CC. A CC carrying group common PDCCH is not a common CC, and how to improve load balance is specifically described when the CC used to carry the group common PDCCH is not a common CC.

For example, referring to a second row in Table 6, a component carrier a is a common CC in a CC group 1, a CC group 2, and a CC group 3; referring to a third row in Table 6, a component carrier b is a common CC in the CC group 2, the CC group 3, and a CC group 4; referring to a fourth row in Table 6, a component carrier c is a common CC in the CC group 1 and the CC group 2; and referring to a fifth row in Table 6, a component carrier d is a common CC in the CC group 3 and the CC group 4. A component carrier that carries a group common PDCCH in the CC group 1 is a CC1, a component carrier that carries a group common PDCCH in the CC group 2 is a CC2, a component carrier that carries a group common PDCCH in the CC group 3 is a CC3, and a component carrier that carries a group common PDCCH in the CC group 4 is a CC4. Based on this, during CC configuration for the UE, for the configuration of the carrier a, b, c, or d, quantities of UEs to which the CC1, the CC2, the CC3, and the CC4 are allocated may be considered, to facilitate system load balance. For example, the carrier a and the CC1 are allocated to UE1, the carrier b and the CC3 are allocated to UE2, the carrier c and the CC2 are allocated to UE3, and the carrier d and the CC4 are allocated to UE4.

TABLE 6

|   | CC1      | CC2        | CC3       | CC4       |
|---|----------|------------|-----------|-----------|
| a | CC group1 | CC group 2 | CC group3 |           |
| b |          | CC group 2 | CC group3 | CC group4 |
| c | CC group1 | CC group 2 |           |           |
| d |          |            | CC group3 | CC group4 |

The following specifically describes the second possible manner (a CC is configured for the UE based on a granularity of a CC group).

For example, all CCs occupied by a base station are divided into two CC groups: a CC group 1 and a CC group 2, and CCs included in the CC group 1 do not overlap (overlap) with CCs included in the CC group 2. Specifically, the CC group 1 includes a CC1 to a CC4, and the CC group 2 includes a CC5 to a CC8.

Figure 7:
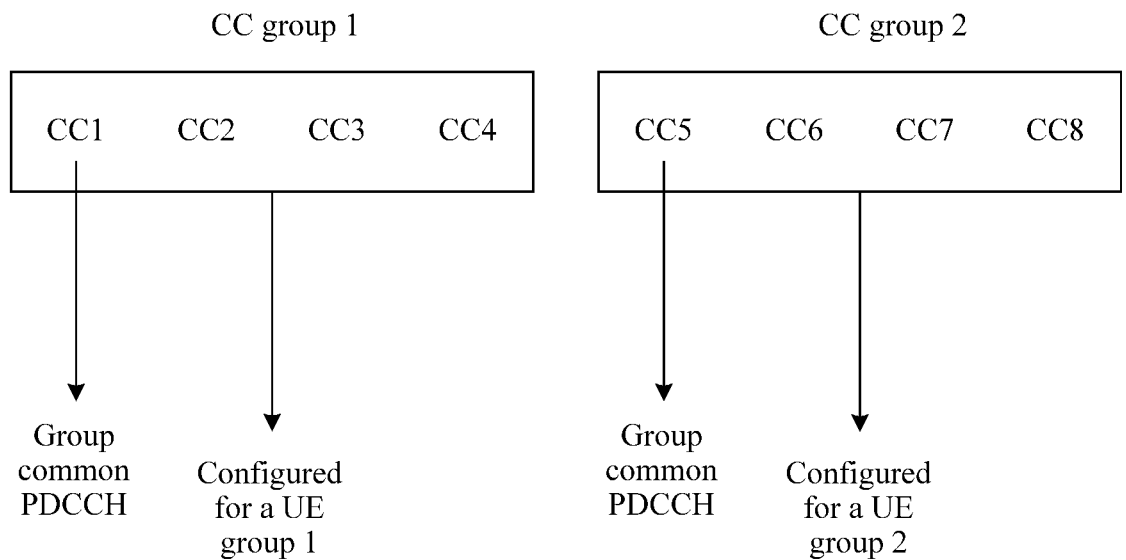
FIG. 7 is a fourth schematic diagram of a CC configuration manner according to an embodiment of this application.

Referring to FIG. 7, it is assumed that all CCs in the CC group 1 are configured for a UE group 1, and all CCs in the CC group 2 are configured for a UE group 2. Each of the CC1 in the CC group 1 and the CC5 in the CC group 2 is used to carry a group common PDCCH. A group common PDCCH on the CC1 is used to carry group UE common information on the CC1 to the CC4, and a group common PDCCH on the CC5 is used to carry group UE common information on the CC5 to the CC8.

Based on this configuration manner, the base station sends information 1 to each UE in the UE group 1, and the information 1 is used to instruct the UE in the UE group 1 to detect a group common PDCCH on the CC1. The base station sends information 2 to each UE in the UE group 2, and the information 2 is used to instruct the UE in the UE group 2 to detect a group common PDCCH on the CC5.

UE1 in the UE group 1 and UE2 in the UE group 2 are used as examples.

The base station sends the information 1 to the UE1. The information 1 may be used to instruct, in any one of Manner 1 to Manner 4, the UE1 to detect the at least one group common PDCCH on the CC1. A case described in Manner 2 is used as an example. The information 1 may include a correspondence among an index value of a CC configured for the UE1, an index value of a CC carrying the group common PDCCH, and a field in the group UE common information. Therefore, by using the information 1, the UE1 can determine a CC on which the group common PDCCH is detected, and can determine a field that is in the group UE common information carried on the detected group common PDCCH and that includes group UE common information of a specific CC, for example, as shown in Table 7.

TABLE 7

| Index value of a CC configured for the UE1 | N CCs used to carry the group common PDCCH | Field (field) in the group UE common information |
|---|---|---|
| CC1 | CC1 | field1 |
| CC2 | CC1 | field2 |
| CC3 | CC1 | field3 |
| CC4 | CC1 | field4 |

After receiving the information 1, the UE1 detects the group common PDCCH on the CC1 according to the information 1, receives the group UE common information on the detected group common PDCCH, and obtains group UE common information of the CC1 from the field 1 in the group UE common information; receives the group UE common information on the detected group common PDCCH, and obtains group UE common information of the CC2 from the field 2 in the group UE common information; receives the group UE common information on the detected group common PDCCH, and obtains group UE common information of the CC3 from the field 3 in the group UE common information; and receives the group UE common information on the detected group common PDCCH, and obtains group UE common information of the CC4 from the field 4 in the group UE common information.

The base station sends the information 2 to the UE2. The information may be used to instruct, in any one of Manner 1 to Manner 4, the UE2 to detect the at least one group common PDCCH on the CC5. A case described in Manner 2 is used as an example. The information 2 may include a correspondence among an index value of a CC configured for the UE2, an index value of a CC carrying the group common PDCCH, and a field included in the group common PDCCH. Therefore, by using the information 2, the UE2 can determine a CC on which the group common PDCCH is detected, and can determine a field that is in the group UE common information carried on the detected group common PDCCH and that includes group UE common information of a specific CC, for example, as shown in Table 8.

TABLE 8

| Index value of a CC configured for the UE2 | N CCs used to carry the group common PDCCH | Field (field) in the group UE common information |
|---|---|---|
| CC5 | CC5 | field1 |
| CC6 | CC5 | field2 |
| CC7 | CC5 | field3 |
| CC8 | CC5 | field4 |

After receiving the information 2, the UE2 detects the group common PDCCH on the CC5 according to the information 2, receives the group UE common information on the detected group common PDCCH, and obtains group UE common information of the CC5 from the field 1 in the group UE common information; receives the group UE common information on the detected group common PDCCH, and obtains group UE common information of the CC6 from the field 2 in the group UE common information; receives the group UE common information on the detected group common PDCCH, and obtains group UE common information of the CC7 from the field 3 in the group UE common information; and receives the group UE common information on the detected group common PDCCH, and obtains group UE common information of the CC8 from the field 4 in the group UE common information.

By using the foregoing solution, the UE only needs to detect the group common PDCCH on the CCs indicated by the base station, and obtains, on the group common PDCCH, the group UE common information configured for the UE, thereby reducing a quantity of blind detection times of the UE, and reducing power consumption of the UE.

In addition, in this embodiment of this application, before configuring the CCs for the UE, the base station may determine a CC on which the group common PDCCH used to carry the group UE common information is located, so that during CC configuration for the UE, the base station only needs to ensure that the CCs configured for the UE include the CC carrying the group common PDCCH, and does not necessarily need to configure a specific CC for each UE. Therefore, flexibility of CC configuration for the UE is improved in comparison with Embodiment 1.

For example, all CCs occupied by a base station are divided into two CC groups: a CC group 1 and a CC group 2, and CCs included in the CC group 1 overlap (overlap) with CCs included in the CC group 2. Specifically, the CC group 1 includes a CC1 to a CC4, and the CC group 2 includes the CC4 to a CC7. The CC group 1 is configured for a UE group 1, and the CC group 2 is configured for a UE group 2.

In a first configuration manner, a group common PDCCH is carried on a common CC, and in a second configuration manner, a group common PDCCH is carried on a non-common CC.

Figure 8:
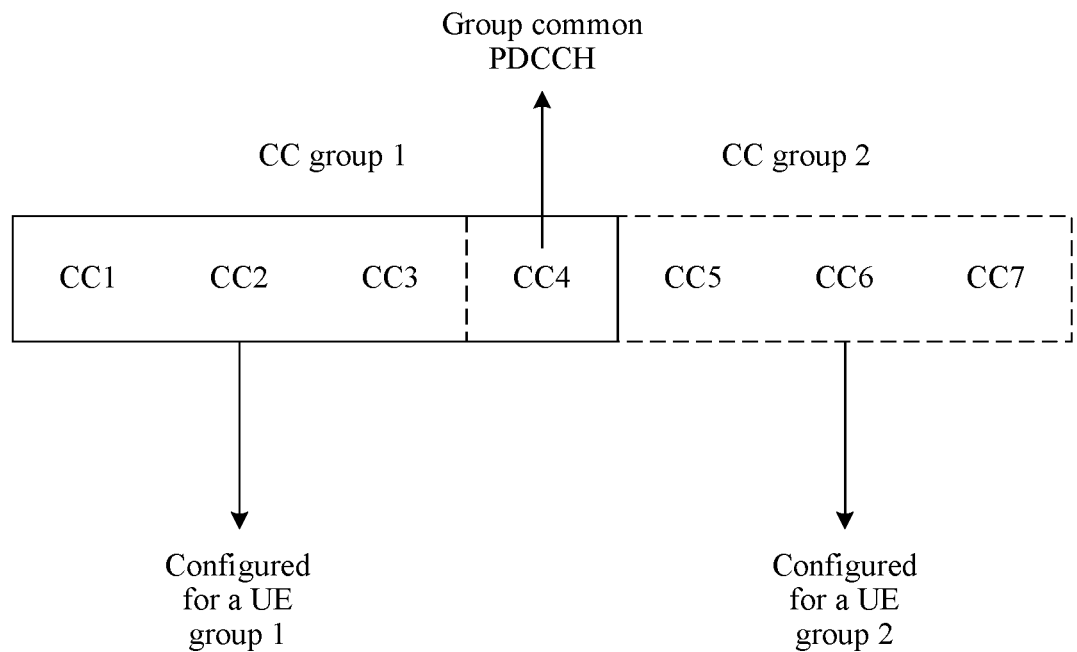
FIG. 8 is a fifth schematic diagram of a CC configuration manner according to an embodiment of this application.

For the first configuration manner in the second possible manner, that a group common PDCCH is carried on a common CC is described as follows:

Referring to FIG. 8, the CC4 is a common CC in the CC group 1 and the CC group 2. The CC4 is used to carry a group common PDCCH, and the group common PDCCH on the CC4 is used to carry group UE common information on CCs in the CC group 1 and the CC group 2. Therefore, the CC4 may carry two group common PDCCHs that are respectively used to indicate group UE common information on the CC group 1 and group UE common information on the CC group 2.

Based on this, the group UE common information carried on the two group common PDCCHs may be respectively scrambled by using identification information of the CC group 1 and identification information of the CC group 2; or the group UE common information carried on the two group common PDCCHs may be respectively scrambled by using identification information of a UE group 1 to which the CC group 1 is allocated and identification information of a UE group 2 to which the CC group 2 is allocated; or the group UE common information carried on the two group common PDCCHs may be respectively scrambled by using identification information of any UE to which the CC group 1 is allocated and identification information of any UE to which the CC group 2 is allocated; or the group UE common information carried on the two group common PDCCHs may be respectively scrambled by using identification information configured on a network side (the identification information needs to be separately notified to UE in a UE group 1 to which the CC group 1 is allocated and UE in a UE group 2 to which the CC group 2 is allocated, to distinguish between the group UE common information carried on the two group common PDCCHs).

Based on this configuration manner, the base station sends information 1 to each UE in the UE group 1, and sends information 2 to each UE in the UE group 2. The following uses UE1 in the UE group 1 and UE2 in the UE group 2 as examples. The base station sends the information 1 to the UE1, where the information 1 is used to instruct the UE1 to detect a group common PDCCH on the CC4. Specifically, the information 1 may include a correspondence among an index value of a CC configured for the UE1, an index value of a CC carrying the group common PDCCH, a field in the group UE common information, and identification information used to scramble the group UE common information. Therefore, by using the information 1, the UE1 can determine a CC on which the group common PDCCH is detected, and identification information used for descrambling the group UE common information, and can determine a field that is in the descrambled group UE common information and that includes group UE common information of a specific CC, for example, as shown in Table 9.

TABLE 9

| Index value of a CC configured for the UE2 | N CCs used to carry the group common PDCCH | Field (field) included in the group UE common information | Identification information used for scrambling the group common PDCCH |
|---|---|---|---|
| CC1 | CC4 | field1 | Identification information of the UE group 1 |
| CC2 | CC4 | field2 | |
| CC3 | CC4 | field3 | |
| CC4 | CC4 | field4 | |

The base station sends the information 2 to the UE2, where the information 2 is used to instruct the UE2 to detect a group common PDCCH on the CC4. Specifically, the information 2 may include a correspondence among an index value of a CC configured for the UE2, an index value of a CC carrying the group common PDCCH, a field in the group UE common information, and identification information used to scramble the group UE common information. Therefore, by using the information 2, the UE2 can determine a CC on which the group common PDCCH is detected, and identification information used for descrambling the group UE common information, and can determine a field that is in the descrambled group UE common information and that includes group UE common information of a specific CC, for example, as shown in Table 10.

TABLE 10

| Index value of a CC configured for the UE2 | N CCs used to carry the group common PDCCH | Field (field) included in the group UE common information | Identification information used for scrambling the group common PDCCH |
|---|---|---|---|
| CC4 | CC4 | field1 | Identification information of the UE group 2 |
| CC5 | CC4 | field2 | |
| CC6 | CC4 | field3 | |
| CC7 | CC4 | field4 | |

Certainly, in the first configuration manner in the second possible manner, there may be only one group common PDCCH on the CC4. The group common PDCCH is used to carry group UE common information, and the group UE common information is used to indicate the group UE common information of the CCs in the CC group 1 and indicate the group UE common information of the CCs included in the CC group 2. The group UE common information may be scrambled by using common identification information of the CC group 1 and the CC group 2; or the group UE common information may be scrambled by using common identification information of the UE group 1 to which the CC group 1 is allocated and the UE group 2 to which the CC group 2 is allocated; or the group UE common information may be scrambled by using identification information of any UE to which the CC group 1 is allocated or identification information of any UE to which the CC group 2 is allocated; or the group UE common information may be scrambled by using identification information configured on the network side (the identification information needs to be notified to UE in the UE group 1 to which the CC group 1 is allocated and UE in the UE group 2 to which the CC group 2 is allocated). This is not specifically limited in this application. In this case, an indication manner of the information 1 and the information 2 may also be any one of Manner 1 to Manner 4, and this is not specifically limited in this application.

Figure 9:
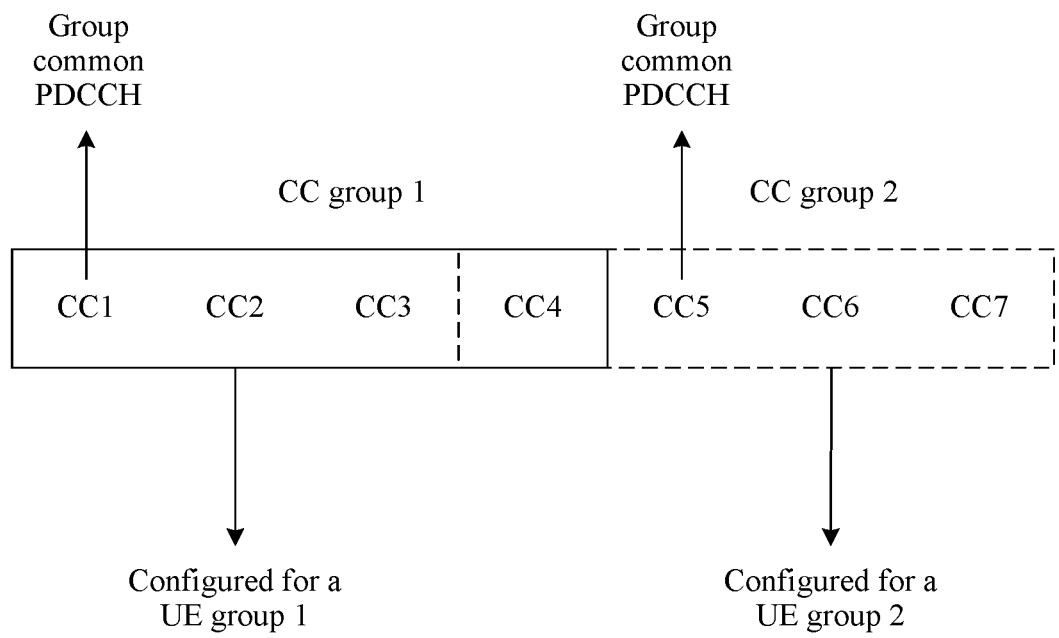
FIG. 9 is a sixth schematic diagram of a CC configuration manner according to an embodiment of this application.

For the second configuration manner in the second possible manner, that a group common PDCCH is carried on a non-common CC is described as follows:

Referring to FIG. 9, the CC4 is a common CC in the CC group 1 and the CC group 2. The CC1 and the CC5 are used to carry a group common PDCCH. A group common PDCCH on the CC1 is used to carry group UE common information on the CC1 to the CC4, and a group common PDCCH on the CC5 is used to carry group UE common information on the CC4 to the CC7.

Based on this configuration manner, the base station sends information 1 to each UE in the UE group 1, and sends information 2 to each UE in the UE group 2. The information 1 is used to instruct each UE in the UE group 1 to detect the group common PDCCH on the CC1, and the information 2 is used to instruct each UE in the UE group 2 to detect the group common PDCCH on the CC5. The following uses UE1 in the UE group 1 as an example. The base station sends the information 1 to the UE1, where the information 1 is used to instruct the UE1 to detect a group common PDCCH on the CC1. Specifically, the information 1 may include a correspondence among an index value of a CC configured for the UE, an index value of a CC carrying the group common PDCCH, and a field included in the group common PDCCH. Therefore, by using the information 1, the UE1 can determine a CC on which the group common PDCCH is detected, and can determine a field that is in the group UE common information and that includes group UE common information of a specific CC, for example, as shown in Table 11.

TABLE 11

| Index value of a CC configured for the UE | N CCs used to carry the group common PDCCH | Field (field) included in the group UE common information |
|---|---|---|
| CC1 | CC1 | field1 |
| CC2 | CC1 | field2 |
| CC3 | CC1 | field3 |
| CC4 | CC1 | field4 |

After receiving the information 1, the UE1 detects the group common PDCCH on the CC1 according to the information 1, receives the group UE common information on the detected group common PDCCH, and obtains group UE common information of the CC1 from the field 1 in the group UE common information; receives the group UE common information on the detected group common PDCCH, and obtains group UE common information of the CC2 from the field 2 in the group UE common information; receives the group UE common information on the detected group common PDCCH, and obtains group UE common information of the CC3 from the field 3 in the group UE common information; and receives the group UE common information on the detected group common PDCCH, and obtains group UE common information of the CC4 from the field 4 in the group UE common information.

By using the foregoing solution, the UE only needs to detect the group common PDCCH on the CCs indicated by the base station, and obtains, on the group common PDCCH, the group UE common information of the CCs configured for the UE, thereby reducing a quantity of blind detection times of the UE, and reducing power consumption of the UE.

In addition, in this embodiment of this application, before configuring the CCs for the UE, the base station may determine a CC on which the group common PDCCH used to carry the group UE common information is located, so that during CC configuration for the UE, the base station only needs to ensure that the CCs configured for the UE include the CC carrying the group common PDCCH, and does not necessarily need to configure a specific CC for each UE. Therefore, flexibility of CC configuration for the UE is improved in comparison with Embodiment 1. In addition, when there are a relatively large quantity of common CCs in different CC groups, and when the CC used to carry the group common PDCCH is not a common CC, flexibility of CC configuration for the UE can be further improved compared with a manner in which the CC used to carry the group common PDCCH is a common CC, to enable system load balance.

Figure 10:
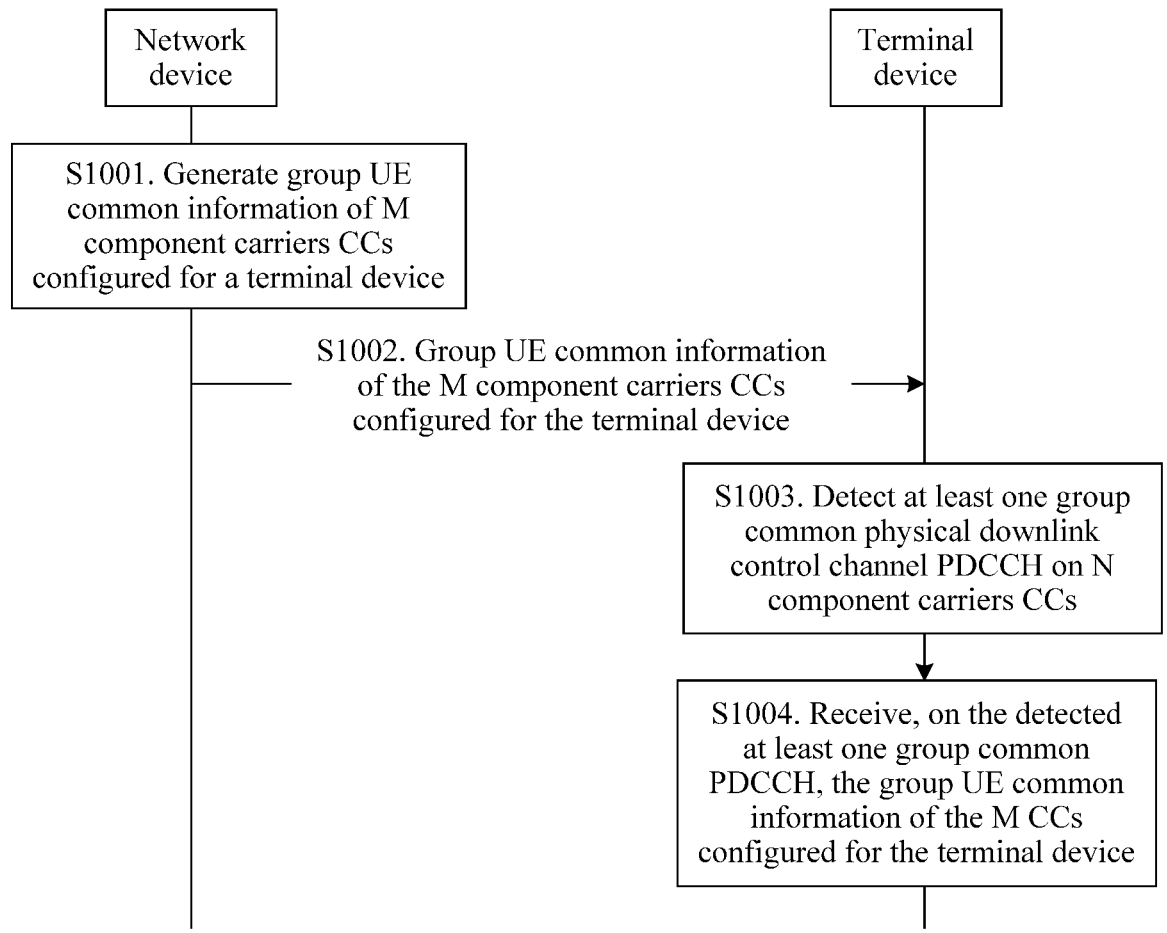
FIG. 10 is a flowchart of an information transmission method according to an embodiment of this application.

Referring to FIG. 10, FIG. 10 is a schematic flowchart of another information transmission method according to an embodiment of this application. The information transmission method includes the following steps.

S1001. A network device generates group UE common information of M component carriers CCs configured for the terminal device.

S1002. The network device sends, to the terminal device on at least one group common PDCCH on N CCs, the group UE common information of the M CCs configured for the terminal device, where N is a positive integer and is less than or equal to M, and M is a positive integer.

The N CCs are in the M CCs configured for the terminal device.

S1003. The terminal device detects the at least one group common physical downlink control channel PDCCH on the N component carriers CCs, where the at least one group common PDCCH is used to indicate the group user equipment UE common information of the M CCs configured for the terminal device, N is a positive integer and is less than or equal to M, and M is a positive integer.

S1004. The terminal device receives, on the detected at least one group common PDCCH, the group UE common information of the M CCs configured for the terminal device.

By using the foregoing solution, the terminal device does not need to detect all CCs to obtain the group common PDCCH, and only needs to detect the at least one group common PDCCH on the N component carriers CCs to obtain the group UE common information of the M CCs configured for the terminal device, thereby reducing a quantity of blind detection times of the terminal device, and reducing power consumption of the terminal device.

In this embodiment of this application, the terminal device detects the at least one group common PDCCH on a specific CC. A possible implementation is a static configuration manner, and another possible implementation is a semi-static configuration manner. Specifically, before the terminal device detects the at least one group common physical downlink control channel PDCCH on the N component carriers CCs, the network device sends the first information to the terminal device, where the first information is used to instruct the terminal device to detect the at least one group common PDCCH on the N CCs. Therefore, after receiving the first information sent by the network device, the terminal device detects the at least one group common PDCCH on the N component carriers CCs according to the first information.

In the static configuration manner, all CCs occupied by a base station are in one CC group. In other words, all CCs form one CC group. In this scenario, the base station may statically configure N CCs in the CC group to be used to carry at least one group common PDCCH. All CCs included in the base station are divided into a plurality of CC groups. The base station may configure one or more CCs in each CC group to be used to carry at least one group common PDCCH, and the at least one group common PDCCH is used to carry group UE common information of all CCs in the CC group. When different CC groups include a common CC, a group common PDCCH may be carried on the common CC, and the group common PDCCH may be used to carry group UE common information of CCs included in different CC groups. Certainly, a group common PDCCH may also be carried on a non-common CC, and one or more CCs in each CC group are used to carry the group common PDCCH, and the group common PDCCH carries group UE common information of CCs included in the CC group. When different CC groups include a common CC, one or more CCs in each CC group are used to carry the group common PDCCH, and the group common PDCCH carries group UE common information of CCs included in the CC group. Specifically, during determining of a CC on which the terminal device detects the at least one group common PDCCH, for a specific configuration manner, refer to the configuration manners in the embodiments shown in FIG. 4 to FIG. 9, and details are not described herein again.

When a CC on which the terminal device detects the at least one group common PDCCH is indicated in the semi-static configuration manner, for a specific indication manner, refer to the indication manners in the embodiments shown in FIG. 4 to FIG. 9, and details are not described herein again.

Figure 11:
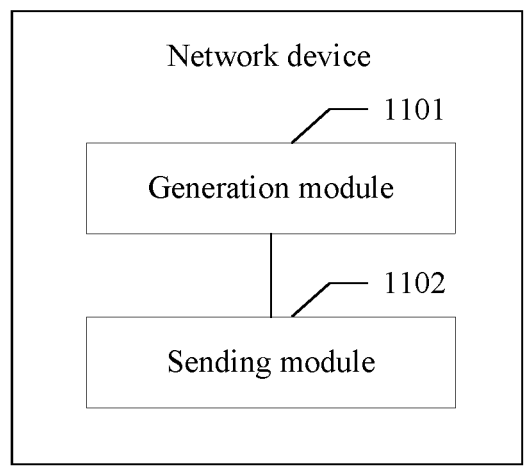
FIG. 11 is a schematic structural diagram of a network device according to an embodiment of this application.

Based on a same inventive concept as the method embodiments corresponding to FIG. 4 to FIG. 9, an embodiment of this application provides an information transmission apparatus. The apparatus is applied to a network device. As shown in FIG. 11, the apparatus includes: a generation module 1101, configured to generate first information; and a sending module 1102, configured to send the first information to a terminal device, where the first information is used to instruct the terminal device to detect at least one group common PDCCH on N CCs, N is a positive integer and is less than or equal to M, M is a quantity of CCs configured for the terminal device, and M is a positive integer.

Optionally, the N CCs are in the M CCs configured for the terminal device.

Optionally, the first information includes index values of the N CCs.

Optionally, the group common PDCCH is used to indicate group user equipment UE common information of the M CCs configured for the terminal device.

Optionally, the group UE common information includes at least one of time domain unit format information, group UE frequency domain resource information, and preemption indication information.

Optionally, the first information may include a correspondence among index values of the M CCs configured for the terminal device, the index values of the N CCs, and a field included in the group UE common information; or a correspondence among index values of the M CCs configured for the terminal device, the index values of the N CCs, a field in the group UE common information, and identification information used for scrambling the group UE common information.

Optionally, the group UE common information is scrambled by using identification information of a CC group in which the N CCs are located, or the group UE common information is scrambled by using identification information of a terminal device group in which the terminal device is located, or the group UE common information is scrambled by using identification information of the terminal device.

Optionally, the sending unit is specifically configured to send the first information to the terminal device by using downlink control information DCI signaling, radio resource control RRC signaling, or cell broadcast signaling.

Figure 12:
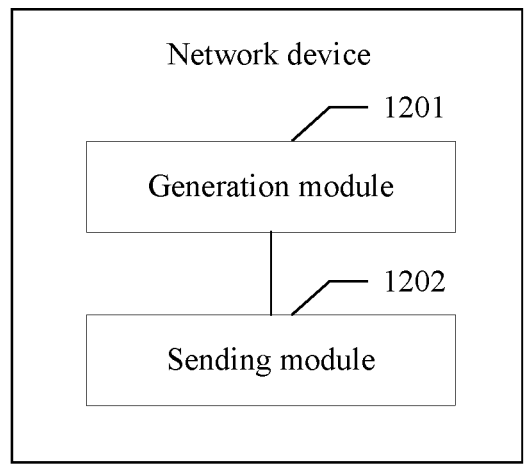
FIG. 12 is a schematic structural diagram of another network device according to an embodiment of this application.

Based on a same inventive concept as the method embodiment corresponding to FIG. 10, an embodiment of this application provides an information transmission apparatus. The apparatus is applied to a network device. As shown in FIG. 12, the apparatus includes: a generation module 1201, configured to generate group user equipment UE common information of M component carriers CCs configured for the terminal device; and a sending module 1202, configured to send, to the terminal device on at least one group common PDCCH on N component carriers CCs, the group UE common information of the M CCs configured for the terminal device, where N is a positive integer and is less than or equal to M, and M is a positive integer.

Optionally, the N CCs are in the M CCs configured for the terminal device.

Optionally, the sending module 1202 is further configured to send first information, where the first information is used to instruct the terminal device to detect the at least one group common PDCCH on the N CCs.

Optionally, the first information includes index values of the N CCs.

Optionally, the group common PDCCH is scrambled by using identification information of a CC group in which the at least one CC is located, or the group UE common information is scrambled by using identification information of a terminal device group in which the terminal device is located, or the group common PDCCH is scrambled by using identification information of the terminal device.

Optionally, the first information further includes a correspondence among index values of the M CCs configured for the terminal device, the index values of the N CCs, and a field in the group UE common information; or a correspondence among index values of the M CCs configured for the terminal device, the index values of the N CCs, a field in the group UE common information, and identification information used for scrambling the group UE common information.

Optionally, when sending the first information to the terminal device, the sending module 1202 is specifically configured to send the first information to the terminal device by using downlink control information DCI signaling, radio resource control RRC signaling, or cell broadcast signaling.

Optionally, the group UE common information includes at least one of time domain unit format information, group UE frequency domain resource information, and preemption indication information.

Module division in this embodiment of this application is an example and is merely logical function division, and may be other division during actual implementation. In addition, functional modules in the embodiments of this application may be integrated into one processor or may exist alone physically, or two or more modules may be integrated into one module. The integrated module may be implemented in a form of hardware, or may be implemented in a form of a software functional module.

Figure 13:
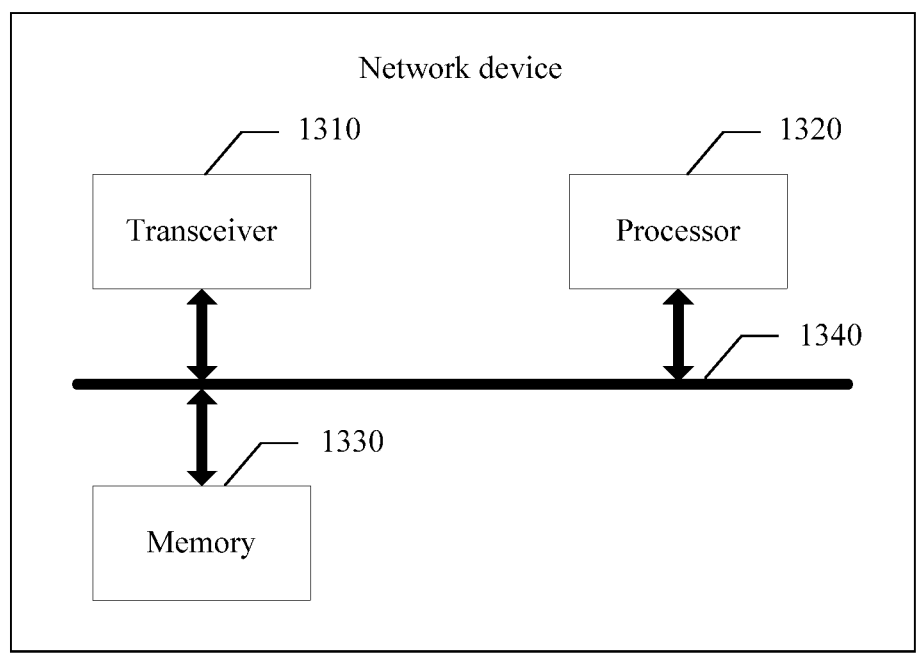
FIG. 13 is a schematic structural diagram of still another network device according to an embodiment of this application.

As shown in FIG. 13, a network device may include a transceiver 1310, a processor 1320, and a memory 1330o. Both the generation module and the sending module shown in FIG. 11 or FIG. 12 may be controlled and implemented by the processor 1320. The processor 1320 receives and sends data by using the transceiver 1310 and is configured to implement the method performed by the base station in the embodiments corresponding to FIG. 3 to FIG. 10. In an implementation process, the steps in the processing procedure may be completed by using an integrated logic circuit of hardware in the processor 1320 or an instruction in a form of software. The processor 1320 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general purpose processor may be a microprocessor, any conventional processor, or the like. The steps of the methods disclosed in the embodiments of this application may be directly performed by a hardware processor, or may be performed by using a combination of hardware and software modules in the processor. Program code used by the processor 1320 to implement the foregoing method may be stored in the memory 1330o. The memory 1330 may be a nonvolatile memory such as a hard disk or a solid state disk, or may be a volatile memory such as a random access memory. The memory 1330 is any other medium that can be configured to carry or store desired program code in a form of an instruction or a data structure and that can be accessed by a computer, but is not limited thereto.

A specific connection medium between the transceiver 1310, the processor 1320, and the memory 1330 is not limited in this embodiment of this application. In this embodiment of this application, the memory 1330, the processor 1320, and the transceiver 1310 are connected by using a bus 1340 in FIG. 13. The bus is represented by using a bold line in FIG. 13. A manner of connection between other components is merely an example for description, and imposes no limitation. The bus may be classified into an address bus, a data bus, a control bus, and the like. For ease of indication, the bus is indicated by using only one bold line in FIG. 13. However, it does not indicate that there is only one bus or only one type of bus.

Figure 14:
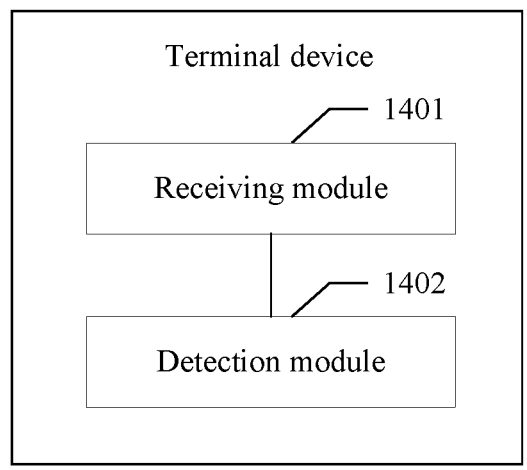
FIG. 14 is a schematic structural diagram of a terminal device according to an embodiment of this application.

Based on a same inventive concept as the embodiments shown in FIG. 3 to FIG. 9, an embodiment of this application provides an information transmission apparatus. The apparatus is applied to a terminal device. As shown in FIG. 14, the apparatus includes: a receiving module 1401, configured to receive first information sent by a network device, where the first information is used to instruct the terminal device to detect at least one group common physical downlink control channel PDCCH on N component carriers CCs, N is a positive integer and is less than or equal to M, M is a quantity of CCs configured for the terminal device, and M is a positive integer; and a detection module 1402, configured to detect the at least one group common physical downlink control channel PDCCH on the N CCs according to the first information.

Optionally, the N CCs are in the M CCs configured for the terminal device.

Optionally, the first information includes index values of the N CCs.

Optionally, the group common PDCCH is used to indicate group user equipment UE common information of the M CCs configured for the terminal device.

The detection module 1402 is specifically configured to obtain, on the N CCs according to the first information, the group UE common information that is of the M CCs configured for the terminal device and that is carried on the at least one group common PDCCH.

Optionally, the group UE common information includes at least one of time domain unit format information, group UE frequency domain resource information, and preemption indication information.

Optionally, the first information includes a correspondence among index values of the M CCs configured for the terminal device, the index values of the N CCs, and a field in the group UE common information; or a correspondence among index values of the M CCs configured for the terminal device, the index values of the N CCs, a field in the group UE common information, and identification information used for scrambling the group UE common information.

Optionally, the group UE common information is scrambled by using identification information of a CC group in which the at least one CC is located, or the group UE common information is scrambled by using identification information of a terminal device group in which the terminal device is located, or the group UE common information is scrambled by using identification information of the terminal device.

Optionally, the receiving module 1401 is specifically configured to receive downlink control information DCI signaling sent by the network device, where the DCI signaling carries the first information; or receive radio resource control RRC signaling sent by the network device, where the RRC signaling carries the first information; or receive cell broadcast signaling sent by the network device, where the RRC signaling carries the first information.

Figure 15:
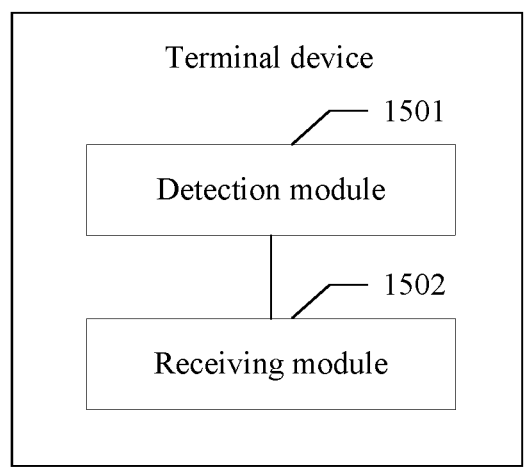
FIG. 15 is a schematic structural diagram of another terminal device according to an embodiment of this application.

Based on a same inventive concept as the embodiment shown in FIG. 10, an embodiment of this application provides an information transmission apparatus. The apparatus is applied to a terminal device. As shown in FIG. 15, the apparatus includes: a detection module 1501, configured to detect at least one group common physical downlink control channel PDCCH on N component carriers CCs, where the at least one group common PDCCH is used to indicate group user equipment UE common information of M CCs configured for the terminal device, N is a positive integer and is less than or equal to M, and M is a positive integer; and a receiving module 1502, configured to receive, on the detected at least one group common PDCCH, the group UE common information of the M CCs configured for the terminal device.

Optionally, the N CCs are in the M CCs configured for the terminal device.

Optionally, the receiving module 1502 is further configured to receive first information sent by the network device, where the first information is used to instruct the terminal device to detect the at least one group common PDCCH on the N CCs, and the detection module 1501 is specifically configured to detect the at least one group common PDCCH on the N component carriers CCs according to the first information.

Optionally, the first information includes index values of the N CCs.

Optionally, the group UE common information is scrambled by using identification information of a CC group in which the N CCs are located, or the group UE common information is scrambled by using identification information of a terminal device group in which the terminal device is located, or the group UE common information is scrambled by using identification information of the terminal device.

Optionally, the first information further includes a correspondence among index values of the M CCs configured for the terminal device, the index values of the N CCs, and a field in the group UE common information; or a correspondence among index values of the M CCs configured for the terminal device, the index values of the N CCs, a field in the group UE common information, and identification information used for scrambling the group UE common information.

Optionally, when receiving the first information sent by the network device, the receiving module 1502 is specifically configured to receive downlink control information DCI signaling sent by the network device, where the DCI signaling carries the first information; or receive radio resource control RRC signaling sent by the network device, where the RRC signaling carries the first information; or receive cell broadcast signaling sent by the network device, where the RRC signaling carries the first information.

Optionally, the group UE common information includes at least one of time domain unit format information, group UE frequency domain resource information, and preemption indication information.

Module division in this embodiment of this application is an example and is merely logical function division, and may be other division during actual implementation. In addition, functional modules in the embodiments of this application may be integrated into one processor or may exist alone physically, or two or more modules may be integrated into one module. The integrated module may be implemented in a form of hardware, or may be implemented in a form of a software functional module.

Figure 16:
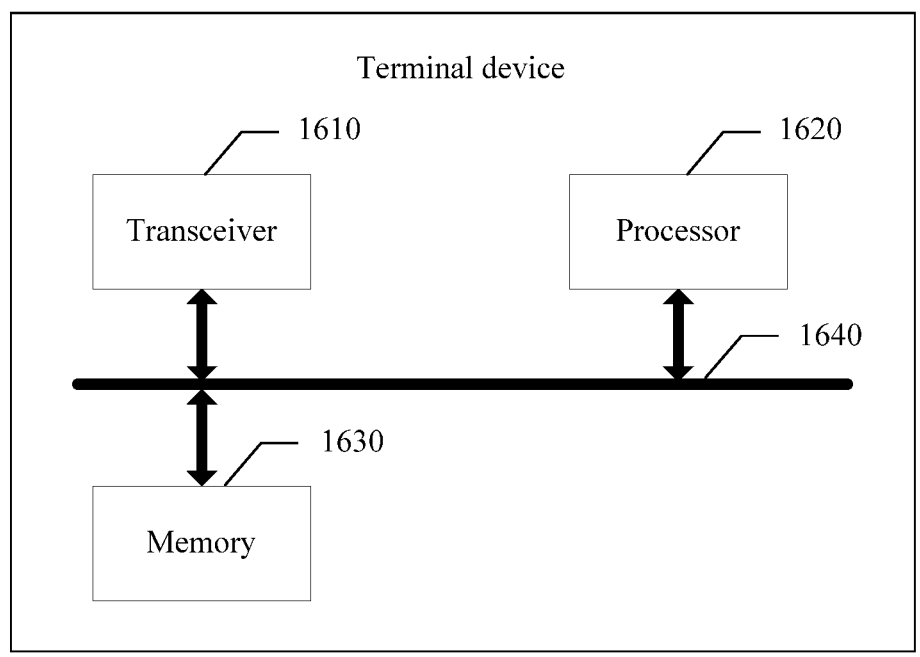
FIG. 16 is a schematic structural diagram of still another terminal device according to an embodiment of this application.

As shown in FIG. 16, a terminal device may include a transceiver 1610, a processor 1620, and a memory 1630. Both the receiving module 1502 and the detection module 1501 shown in the foregoing FIG. 14 or FIG. 15 may be implemented by the processor 1620. The processor 1620 receives and sends data by using the transceiver 1610 and is configured to implement the method performed by the terminal device or UE in FIG. 3 to FIG. 10. In an implementation process, the steps in the processing procedure may be completed by using an integrated logic circuit of hardware in the processor 1620 or an instruction in a form of software. The processor 1620 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general purpose processor may be a microprocessor, any conventional processor, or the like. The steps of the methods disclosed in the embodiments of this application may be directly performed by a hardware processor, or may be performed by using a combination of hardware and software modules in the processor. Program code used by the processor 1620 to implement the foregoing method may be stored in the memory 1630. The memory 1630 may be a nonvolatile memory such as a hard disk (English: hard disk drive, HDD for short) or a solid state drive (English: solid-state drive, SSD for short), or may be a volatile memory (English: volatile memory) such as a random access memory (English: random-access memory, RAM for short). The memory 1630 is any other medium that can be configured to carry or store desired program code in a form of an instruction or a data structure and that can be accessed by a computer, but is not limited thereto.

A specific connection medium between the transceiver 1610, the processor 1620, and the memory 1630 is not limited in this embodiment of this application. In this embodiment of this application, the memory 1630, the processor 1620, and the transceiver 1610 are connected by using a bus 1640 in FIG. 16. The bus is represented by using a bold line in FIG. 16. A manner of connection between other components is merely an example for description, and imposes no limitation. The bus may be classified into an address bus, a data bus, a control bus, and the like. For ease of indication, the bus is indicated by using only one bold line in FIG. 16. However, it does not indicate that there is only one bus or only one type of bus.

Based on the foregoing embodiments, an embodiment of this application further provides a computer storage medium. The storage medium stores a software program, and when being read and executed by one or more processors, the software program can implement the methods provided in the foregoing embodiments. The computer storage medium may include any medium that can store program code, such as a USB flash drive, a removable hard disk, a read-only memory, a random access memory, a magnetic disk, or an optical disc.

Based on the foregoing embodiments, an embodiment of this application further provides a chip system. The chip system may include a chip, or may include a chip and another discrete device. The chip system may be applied to a network device, or may be applied to a terminal device. When being applied to the network device, the chip system includes a processor, configured to support a distributed unit, a centralized unit, and the network device, to implement functions in the foregoing embodiments, for example, generate or process data and/or information in the foregoing methods. Optionally, the chip system further includes a memory, and the memory is configured to store a program instruction and data that are necessary for the distributed unit, the centralized unit, and the terminal device. It should be understood that data and/or information processed by the chip may be received from the terminal device, and processed data and/or information may also be sent to the terminal device. When being applied to the terminal device, the chip system includes a processor, configured to support a distributed unit, a centralized unit, and the terminal device, to implement functions in the foregoing embodiments, for example, generate or process data and/or information in the foregoing methods. Optionally, the chip system further includes a memory, and the memory is configured to store a program instruction and data that are necessary for the distributed unit, the centralized unit, and the terminal device. It should be understood that data and/or information processed by the chip may be received from the network device, and processed data and/or information may also be sent to the network device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
generating, by a network device, first information based on N component carriers (CCs), the N CCs being selected, from a plurality of CCs, for carrying group common physical downlink control channels (PDCCHs) for a terminal device; and
sending, by the network device, the first information to the terminal device, wherein the first information indicates the N CCs selected and instructs the terminal device to detect the group common PDCCHs on the N CCs that are indicated for receiving group common information, N is a positive integer greater than 1 and is less than or equal to M, M is a quantity of CCs configured for the terminal device, and M is a positive integer.

2. The method according to claim 1, wherein the N CCs are in the CCs configured for the terminal device.

3. The method according to claim 1, wherein the first information comprises index values of the N CCs.

4. The method according to claim 1, wherein the group common PDCCH indicates group user equipment (UE) common information of the CCs configured for the terminal device.

5. The method according to claim 4, wherein the group UE common information comprises time domain unit format information, group UE frequency domain resource information, or preemption indication information.

6. The method according to claim 4, wherein the first information comprises: a correspondence among index values of the CCs configured for the terminal device, index values of the N CCs, and a field in the group UE common information; or a correspondence among index values of the CCs configured for the terminal device, index values of the N CCs, a field in the group UE common information, and identification information, wherein the group UE common information is scrambled according to the identification information.

7. The method according to claim 1, wherein sending, by the network device, the first information to the terminal device comprises:
sending, by the network device, the first information to the terminal device through downlink control information (DCI) signaling, radio resource control (RRC) signaling, or cell broadcast signaling.

8. A method, comprising:
receiving, by a terminal device, first information from a network device, wherein the first information indicates N component carriers (CCs) selected, from a plurality of CCs, for carrying group common physical downlink control channels (PDCCHs) for the terminal device, and instructs the terminal device to detect the group common PDCCHs on the N CCs indicated for receiving group common information, N is a positive integer greater than 1 and is less than or equal to M, M is a quantity of CCs configured for the terminal device, and M is a positive integer; and
detecting, by the terminal device, one or more of the group common PDCCHs on the N CCs according to the first information.

9. The method according to claim 8, wherein the N CCs are in the CCs configured for the terminal device.

10. The method according to claim 8, wherein the first information comprises index values of the N CCs.

11. The method according to claim 8, wherein the group common PDCCH indicates group user equipment (UE) common information of the CCs configured for the terminal device; and detecting, by the terminal device, the group common PDCCH on the N CCs according to the first information comprises:
obtaining, by the terminal device on the N CCs according to the first information, the group UE common information of the CCs configured for the terminal device, the group UE common information is carried on the group common PDCCH.

12. The method according to claim 11, wherein the group UE common information comprises time domain unit format information, group UE frequency domain resource information, or preemption indication information.

13. The method according to claim 11, wherein the first information comprises:
a correspondence among index values of the CCs configured for the terminal device, index values of the N CCs, and a field in the group UE common information; or
a correspondence among index values of the CCs configured for the terminal device, index values of the N CCs, a field in the group UE common information, and identification information, wherein the group UE common information is scrambled according to the identification information.

14. The method according to claim 11, wherein:
the group UE common information is scrambled according to identification information of a CC group in which the N CCs is located;
the group UE common information is scrambled according to identification information of a terminal device group in which the terminal device is located; or
the group common PDCCH is scrambled according to identification information of the terminal device.

15. The method according to claim 8, wherein receiving, by the terminal device, the first information from the network device comprises:
- receiving, by the terminal device, downlink control information (DCI) signaling from the network device, wherein the DCI signaling carries the first information;
- receiving, by the terminal device, radio resource control (RRC) signaling from the network device, wherein the RRC signaling carries the first information; or
- receiving, by the terminal device, cell broadcast signaling from the network device, wherein the cell broadcast signaling carries the first information.

\* \* \* \* \*